US012718237B2

(12) United States Patent
Colhoun et al.

(10) Patent No.: US 12,718,237 B2
(45) Date of Patent: Aug. 25, 2026

(54) SYSTEMS AND METHODS FOR FACILITATING SECURE ELECTRONIC TRANSACTIONS

(71) Applicant: Grant Colhoun, Oakville (CA)

(72) Inventors: Grant Colhoun, Oakville (CA); David Farago, Welland (CA); Noel Kendall, Burlington (CA)

(73) Assignee: Grant Colhoun, Oakville (CA)

( * ) Notice: Subject to any disclaimer, the term of this patent is extended or adjusted under 35 U.S.C. 154(b) by 0 days.

(21) Appl. No.: 15/291,461

(22) Filed: Oct. 12, 2016

(65) Prior Publication Data

US 2017/0103394 A1 Apr. 13, 2017

Related U.S. Application Data

(60) Provisional application No. 62/240,671, filed on Oct. 13, 2015.

(51) Int. Cl.

| | |
|---|---|
| ***G06Q 20/40*** | (2012.01) |
| ***G06Q 20/36*** | (2012.01) |
| ***G06Q 20/38*** | (2012.01) |

(52) U.S. Cl.

CPC ....... *G06Q 20/401* (2013.01); *G06Q 20/3672* (2013.01); *G06Q 20/3674* (2013.01); *G06Q 20/3821* (2013.01); *G06Q 20/385* (2013.01)

(58) Field of Classification Search

CPC ............. G06Q 20/3821; G06Q 20/367; G06Q 20/401; G06Q 20/3672; G06Q 20/3674; G06Q 20/385

(Continued)

(56) References Cited

U.S. PATENT DOCUMENTS

| | | |
|---|---|---|
| 5,999,625 A | 12/1999 | Bellare et al. |
| 6,157,917 A | 12/2000 | Barber |

(Continued)

FOREIGN PATENT DOCUMENTS

| | | |
|---|---|---|
| EP | 2541478 A1 | 1/2013 |
| WO | 2017/063079 A1 | 4/2017 |

OTHER PUBLICATIONS

Dastidar et al.; Separation of Circulating Tokens (Year: 2009).*

(Continued)

*Primary Examiner* — Nilesh B Khatri
*Assistant Examiner* — Yin Y Choi

(57) ABSTRACT

Various embodiments are described herein for methods and systems for operating a transaction system for facilitating a transaction between a customer system and a merchant system. In one example embodiment, the method of operating the transaction system includes receiving a request for a digital token from the customer system, operating at least one processor to generate the digital token, transmitting the digital token to the merchant system in exchange for at least one item and validating the digital token to confirm the generation of the digital token by the at least one processor. In the various embodiments described herein, the digital token does not contain any identifying information for the customers engaged in the transactions. The digital tokens of the embodiments described herein are highly secure tokens that can be exchanged over a rather insecure network without jeopardizing the security of the transaction system.

12 Claims, 8 Drawing Sheets

(58) Field of Classification Search
USPC ........................................................ 705/75
See application file for complete search history.

(56) References Cited

U.S. PATENT DOCUMENTS

| | | | |
|---|---|---|---|
| 7,590,602 | B1 | 9/2009 | Luzzatto |
| 8,315,952 | B2 | 11/2012 | Algiene |
| 8,438,116 | B2 | 5/2013 | Al-Herz et al. |
| 2002/0007351 | A1* | 1/2002 | Hillegass et al. |
| 2005/0131836 | A1 | 6/2005 | Armstrong et al. |
| 2007/0215689 | A1* | 9/2007 | Algiene |
| 2012/0028609 | A1* | 2/2012 | Hruska |
| 2012/0259782 | A1* | 10/2012 | Hammad |
| 2012/0330846 | A1* | 12/2012 | Light et al. |
| 2014/0025582 | A1* | 1/2014 | Maevsky |
| 2014/0359289 | A1* | 12/2014 | Camenisch et al. |
| 2014/0372308 | A1* | 12/2014 | Sheets |
| 2015/0081567 | A1* | 3/2015 | Boyle et al. |
| 2015/0112870 | A1* | 4/2015 | Nagasundaram et al. |
| 2015/0213443 | A1* | 7/2015 | Geffon et al. |
| 2016/0012526 | A1* | 1/2016 | Kasriel et al. |
| 2016/0275503 | A1* | 9/2016 | George |
| 2016/0277179 | A1* | 9/2016 | Tunstall |
| 2016/0359617 | A1* | 12/2016 | Patel et al. |
| 2017/0149563 | A1* | 5/2017 | Camenisch et al. |
| 2017/0228733 | A1* | 8/2017 | Jordan et al. |

OTHER PUBLICATIONS

Documents relating to International Patent App. No. PCT/CA2016/051187 mailed Dec. 14, 2016 (International Search Report and Written Opinion).
Glenn, Ariel et al. "A Description of Protocols for Private Credentials". Jun. 20, 2001. Zero-Knowledge Systems Inc. Available Online: https://eprint.iacr.org/2001/082.pdf.
Dr. Stefan Brands. "A Technical Overview of Digital Credentials". Feb. 20, 2002. Credentica. . Available Online: www.credentica.com/overview.pdf.
Michael Peirce and Donal O'Mahony. "Scaleable, Secure Cash Payment for WWW Resources with the PayMe Protocol Set". Trinity College, Dublin. 1996 Technical Report. Available Online: https://www.w3.org/Conferences/WWW4/Papers/228/.
Christian Paquin. "U-Prove Cryptographic Specification V1.1—Draft Revision 1". Microsoft Corporation. Feb. 2011.
Christian Paquin. "U-Prove Recommended Parameters Profile V1.0 Profile V1.0—Draft Revision 1". Microsoft Corporation. Feb. 2011.
Christian Paquin. "U-Prove Technology Overview V1.1—Draft Revision 1". Microsoft Corporation. Feb. 2011.
Horat, David. Extended European Search Report received in EP Application No. 16854677.8. Dated Apr. 15, 2019. European Patent Office, Munich, Germany. 8 pages.
Examination Report received in EP Application No. 22187662.6, Dec. 12, 2024, 10 pages.
Bruce Schneier ED—Schneier B: "Applied cryptography, protocols, algorithms and source code in C", Jan. 1, 1996 , , Applied Cryptography : Protocols, Algorithms and Source Code in C, John Wiley & Sons, New York, pp. 139-147, 174-175, 351-354 , XP002143530, ISBN: 978-0-471-11709-4.

* cited by examiner

SYSTEMS AND METHODS FOR FACILITATING SECURE ELECTRONIC TRANSACTIONS

REFERENCE TO RELATED APPLICATIONS

This application claims the benefit of U.S. Provisional Application No. 62/240,671 filed on Oct. 13, 2015, which is incorporated by reference herein in its entirety.

TECHNICAL FIELD

The described embodiments relate to systems and methods for facilitating electronic transactions between parties. Specifically, the described embodiments relate to systems and methods for facilitating secure electronic transactions using digital token.

BACKGROUND

Today's modern economy relies less and less on the use of government issued cash to complete economic transactions. Instead there is an increasingly greater reliance on other forms of payment methods that do not require any exchange of physical cash.

In the cash based model of economic transaction, the transaction is authorized by validating the cash instrument in possession of the parties to the transaction. The cash model of transaction is simple, cheap and easy to implement. However, the cash model is limited by its use. In a cash model, the participants to the transaction are required to be physically present before each other.

The current state of technology, on the other hand, is account based and includes transactions based on instruments such as credit cards, debit cards, stored value transactions, mobile banking etc. In the account based model, the transaction is authorized by validating the identity of the registered account holder or the account owner. While the account based model provides the benefit of transactions between participants located remotely from each other, the identity validation requirement of this model makes it very expensive and susceptible to fraud.

Accordingly, the current models of economic transactions tend to have many drawbacks and complexities. There is accordingly a need for a system and a method for facilitating electronic transactions between parties securely, efficiently, profitably and with simplicity.

SUMMARY

In a broad aspect, at least one embodiment described herein provides a method of operating a transaction system for facilitating a transaction between a customer system and a merchant system, where the method comprises the steps of receiving a request for at least one digital token from the customer system, operating at least one processor to generate the at least one digital token, transmitting the at least one digital token to the merchant system in exchange for at least one item, and validating the at least one digital token to confirm the generation of the at least one digital token by the at least one processor.

In various embodiments, the at least one processor for generating the at least one digital token is located at the customer system, and the method further comprises transmitting the at least one digital token to an issuer system, operating at least one processor at the issuer system to authorize the at least one digital token and generate at least one authorized digital token, and transmitting the at least one authorized digital token to the customer system, wherein the at least one authorized digital token is used by the customer system in the transaction with the merchant system.

In various embodiments, the at least one processor of the issuer system authorizes the at least one digital token based on availability of funds for the customer system transmitting the at least one digital token to the issuer system.

In various embodiments, the at least one digital token transmitted to the issuer system is blinded and the identity of the customer system is unknown to the issuer system.

In various embodiments, the at least one processor for generating the at least one digital token is located at an issuer system, and the method further comprises transmitting the at least one digital token to the customer system, wherein the at least one digital token is used by the customer system in the transaction with the merchant system.

In various embodiments, the merchant system transmits the at least one digital token received from the customer system to the at least one processor for validation.

In various embodiments, the merchant system transmits the at least one digital token received from the customer system to an acquirer system, and the method further comprises processing the at least one digital token at the acquirer system to identify the at least one processor generating the at least one digital token, and transmitting the at least one digital token to the at least one processor for validation.

In various embodiments, if validation is successful, the method comprises transferring the at least one item from the merchant system to the customer system.

In various embodiments, the at least one digital token is generated via cryptography.

In some embodiments, the at least one digital token comprises conditions of use, wherein the conditions of use limit the use of the at least one digital token within the transaction system.

In another aspect, in at least one embodiment described herein, there is provided a system for managing a transaction between a customer system and a merchant system, the system comprising at least one processor configured to receive a request for at least one digital token from the customer system, operate the at least one processor to generate the at least one digital token, transmit the at least one digital token to the customer system for use in the transaction with the merchant system, and validate the at least one digital token to confirm the generation of the at least one digital token by the at least one processor.

In another aspect, in at least one embodiment described herein, there is provided a system for managing a transaction between a customer system and a merchant system, the system comprising at least one processor configured to receive at least one digital token from the customer system, authorize the at least one digital token and generate at least one authorized digital token, transmit the at least one authorized digital token to the customer system, wherein the at least one authorized digital token is used by the customer system in the transaction with the merchant system, and validate the at least one digital token to confirm the authorization of the at least one digital token by the at least one processor.

In various embodiments, the at least one processor is configured to authorize the at least one digital token based on availability of funds for the customer system transmitting the at least one digital token.

In another aspect, in at least one embodiment described herein, there is provided a system for managing a transaction between a customer system and a merchant system, the system comprising at least one processor configured to generate at least one digital token, transmit the at least one digital token to an issuer system for authorization, and receive at least one authorized digital token for use in the transaction with the merchant system.

In another aspect, in at least one embodiment described herein, there is provided a computer-readable medium storing computer-executable instructions, the instructions for causing at least one processor to perform a method of operating a transaction system for facilitating a transaction between a customer system and a merchant system, the method comprising receiving a request for at least one digital token from the customer system, operating at least one processor to generate the at least one digital token, transmitting the at least one digital token to the merchant system in exchange for at least one item, and validating the at least one digital token to confirm the generation of the at least one digital token by the at least one processor.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

Several embodiments of the present invention will now be described in detail with reference to the drawings, in which.

Figure 1:
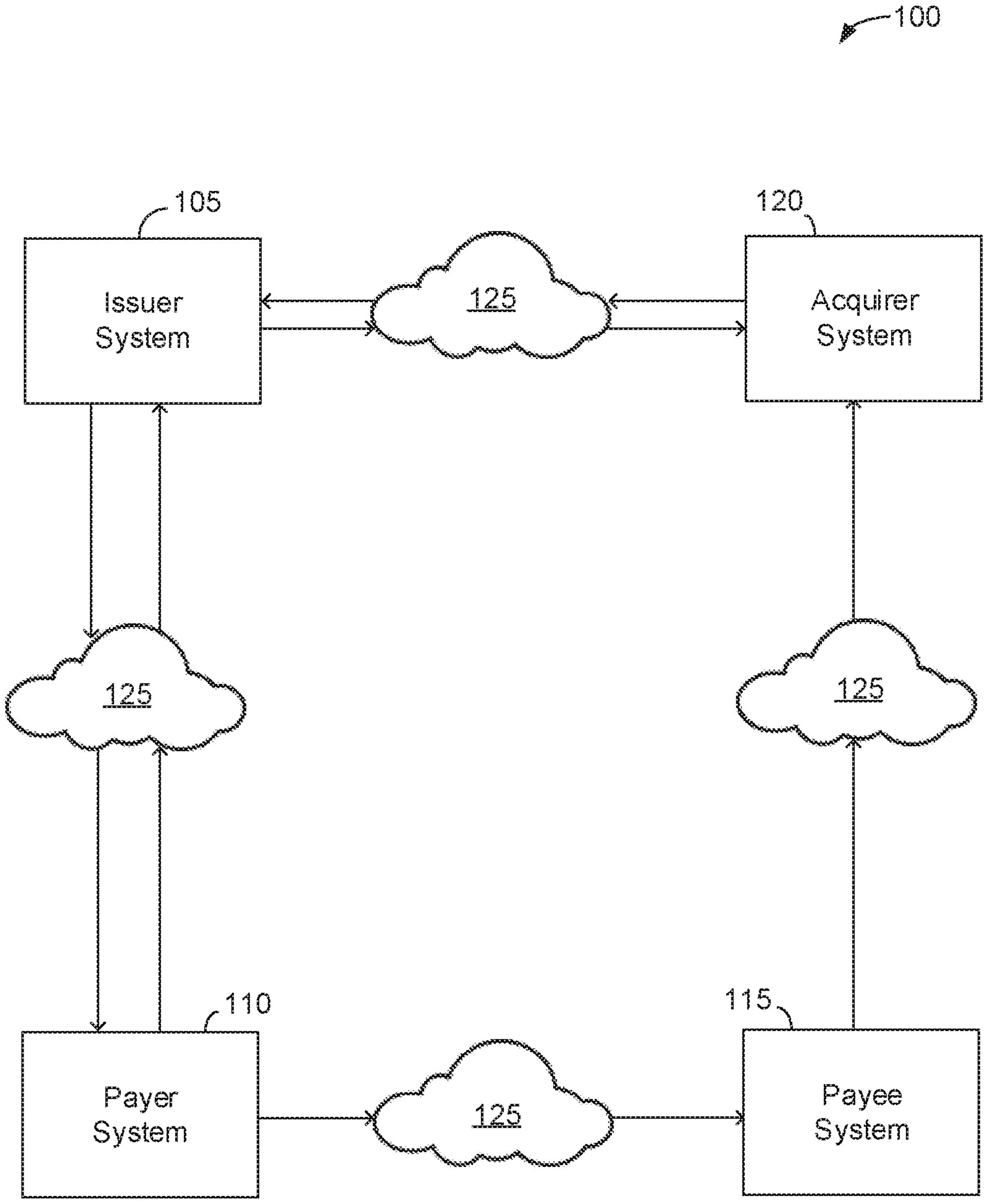
FIG. 1 is a block diagram of a transaction system in accordance with an example embodiment.

The drawings are provided for the purposes of illustrating various aspects and features of the example embodiments described herein. For simplicity and clarity of illustration, elements shown in the FIGS. have not necessarily been drawn to scale. Further, where considered appropriate, reference numerals may be repeated among the FIGS. to indicate corresponding or analogous elements.

DETAILED DESCRIPTION

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, mobile telephone, smartphone or any other computing device capable of being configured to carry out the methods described herein.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a non-transitory computer readable storage medium (e.g. read-only memory, magnetic disk, optical disc). The storage medium so configured causes a computer to operate in a specific and predefined manner to perform the functions described herein.

While particular combinations of various functions and features are expressly described herein, other combinations of these features and functions are possible that are not limited by the particular examples disclosed herein, and these are expressly incorporated within the scope of the present invention.

As the term module is used in the description of the various embodiments, a module includes a functional block that is implemented in hardware or software, or both, that performs one or more functions such as the processing of an input signal to produce an output signal. As used herein, a module may contain sub-modules that themselves are modules.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices can be directly connected to one another or connected to one another through one or more intermediate elements or devices via an electrical element, electrical signal or a mechanical element depending on the particular context. Furthermore, the term "communicative coupling" may be used to indicate that an element or device can electrically, optically, or wirelessly send data to another element or device as well as receive data from another element or device.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

Described herein are example embodiments of systems and methods for facilitating secure electronic transactions using a digital payment instrument or currency. The digital currency of the various embodiments disclosed herein can be any electronic instrument having a value recognized at least by those parties that are participating in a transaction. The digital currency is accordingly usable as a medium of exchange between parties in a transaction.

The digital currency may include a cryptocurrency generated or created using cryptography. The digital currency may also include virtual currency, which may be any regulated or unregulated digital money issued and controlled by its developers. The digital currency may also include any other form of online instrument that may or may not have a physical form, and may be used to buy or sell items in a transaction.

In the various embodiments disclosed herein, the transaction is authorized by validating the currency itself, and not the identity of the payer or the owner of the currency. In other words, the identity of the payer or the owner of the currency is decoupled from the payment instrument, or the currency, itself.

The conventional transaction models, such as an account based model discussed above, is based on securing the entire network and passing insecure information, such as consumer identification including name, account number, password etc., over the secure network. Securing the network in such transaction models is a very cumbersome task. Ensuring network security tends to be very expensive, constantly evolving and prone to fraud. In contrast, in the various embodiments disclosed herein, the systems and methods are based on making high security digital payment instruments and passing them over available networks, which may be secure or insecure networks. As will be described in further detail below, such high security digital payment instruments may be implemented to provide non-ID-based and multi-coin payment instruments in which the instrument itself is secured rather than the entire network and the necessary endpoints needed to facilitate electronic transactions. As such, the high security digital payment instruments described herein may be viewed as combining the desirable attributes of cash instruments and electronic transactions Reference is first made to FIG. 1, which illustrates a block diagram of a transaction system 100 according to an example embodiment. Transaction system 100 comprises an issuer system 105, a consumer or payer system 110, a merchant or payee system 115, an acquirer system 120 and a communication network 125.

Communication network 125 may be any network or network components capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.), and others, including any combination of these.

Issuer system 105 may be a networked computing device or a server including a processor and memory, and being capable of communicating with a communication network 125. Issuer system 105 may alternatively be a distributed system including more than one networked computing devices or servers capable of communicating with each other. The distributed system implementation of the issuer system 105 may have one or more processors with computing processing abilities and memory such as a database(s) or file system(s).

Issuer system 105 is any entity that holds value of a digital currency on behalf of a consumer or payer system 110. Issuer system 105 may be a financial institution, such as a bank, or any other legal entity that stores and safeguards value for the consumer or payer system 110.

The primary function of the issuer system 105 is to control the flow of digital currency into and out of circulation within the transaction system 100. In some embodiments, the issuer system 105 mints the digital currency and issues it to the payer system 110. The digital currency may be issued to the payer system 110 upon the request of the payer system 110, at a predetermined frequency, or based on some other pre-established rule or understanding between the issuer system 105 and the payer system 110. For example, a fixed value of digital currency may be issued to the payer system 110 at the beginning of every month, or every two weeks etc., but additional digital currency may also be issued to the payer system 110 upon request.

In some other embodiments, the payer system 110 mints the digital currency and the issuer system 105 authorizes the minted digital currency for circulation within the transaction system 100. In such embodiments, the minted digital currency is recognized by the various components of the transaction system 100 only after the issuer system 105 authorizes the minted digital currency as being valid for use. In such embodiments, both the issuer system 105 and the payer system 110 participate in the minting of the digital currency.

In one example, the payer system 110 mints or generates digital coins of various denominations using cryptography. In some embodiments, the cryptographic protocols used may incorporate a level of flexibility in which the issuer system 105 and/or their associated payer system 110 may implement their own version of cryptographic tokens using different, yet interoperable cryptographic methods. Such flexibility may be desirable since improvements in cryptographic technologies that develop over time may be quickly incorporated. For example, issuer system "A" implements RSA 2024, issuer system "B" implements DSA 4000, issuer system "C" implements U-Prove while issuer system "D" implements elliptic curve cryptography (ECC). Since each issuing system generally validates its own digital coins during a transaction, the issuer systems may therefore implement or change their choice of cryptographic method within the same system, allowing multiple cryptographic schemes to interoperate within the same system. The minted coins are then blinded by the payer system 110 using a blind signature technique. The process of blinding minted coins may include multiplying the minted coins by a random factor. The purpose of blinding is to ensure that no entity, other than the one responsible for minting the digital coins, knows with any certainty the exact denominations and/or owner of the minted coins. This may provide the advantages of full anonymity since the minted coins cannot be traced to the payer system 110.

Next, the blinded digital coins may be packaged into a message, which may be digitally signed by the private key of the payer system 110 and encrypted with the public key of the issuer system 105, and transmitted to the issuer system 105 via communication network 125 for authorization. The purpose of packaging the blinded digital coins into a message using encryption before transmission to the issuer system 105 is to ensure that no entity other than the issuer system 105 can decrypt the message.

Upon receiving the message at the issuer system 105, the issuer system 105 decrypts the message and checks the digital signature of the payer system 110. The issuer system 105 next checks to see if the payer system 110 has an amount equivalent to the minted amount in a corresponding financial record, such as a bank account. In some cases, the issuer system authorizes the minted digital currency for use within the transaction system 100 only if the amount equivalent to the minted amount can be debited successfully from the bank account of the payer system 110. In some other cases, the issuer system may authorize the minted digital currency for use within the transaction system 100 even if the amount equivalent to the minted amount cannot be debited successfully from the bank account of the payer system 110 at the time of the authorization, but can be debited at some time in the future.

After debiting the equivalent amount from the bank account of the payer system 110 or after establishing confidence that the amount can be debited in the future, the issuer system 105 authorizes the minted digital currency and transmits the authorized digital currency back for the payer system 110 for immediate or future use.

In various embodiments, the issuer system 105 is configured to define, update and maintain consumer financial records. Each consumer financial record corresponds to each payer system 110 with which the issuer system 105 can interact. In various cases, the issuer system 105 is communicably linked to a financial services account of the payer system 110 and is configured to define, update and maintain the consumer financial record based on the information received from the bank account. The financial services account may include, but not limited to, an account associated with the consumer's bank, debit card, credit card; or a non-account such as a one-time "suspension account" such as those established for remittance transactions.

In some cases, each consumer financial record identifies the government issued currency (such as, for example, domestic currency, foreign currency etc.) in the possession of the payer system 110. In some other cases, each consumer financial record additionally identifies other commodities owned by the payer system 110, such as iron, gold, silver, diamonds etc. In some further cases, each consumer financial record may additionally identify real estate, stocks/bonds and/or other securities etc., and/or any other instrument having monetary value owned by the payer system 110.

In various embodiments, the issuer system 105 is further configured to transfer value to third party as payment. When the payer system 110 uses the authorized digital currencies in a transaction with a merchant or a payee system 115 within the transaction system 100, the issuer system 105 is configured to transfer the equivalent value of government issued currency to the merchant or merchant's representative, such as merchant's bank, as payment.

The issuer system 105 is configured to validate the digital currency being transferred from the payer system 110 to the payee system 115 before making the payment to the merchant or merchant's representative. When the digital currency is transferred from the payer system 110 to the payee system 115, the payee system 115 or an acquirer system 120 transfers the digital currency to the issuer system 105 for validation. The issuer system 105 validates, or in other words, ensures that the digital currency in use is valid currency. In most cases, the issuer system 105 validates the digital currency by confirming that the issuer system 105 authorized the digital currency for use in the first place.

Additionally, the issuer system 105 is also configured to modify or cancel the digital currency after use or transfer. After a digital currency is successfully transferred to a merchant or a payee system 115 by a payer system 110, i.e. after the digital currency is validated by the issuer system 105, the issuer system 105 cancels or modifies the digital currency for future use or transfer. For example, if a digital currency worth $5 CAD is successfully transferred from the payer system 110 to a payee system 115 for a transaction worth $5 CAD, the issuer system 105 cancels this digital currency for any future use or transfer. However, if a digital currency worth $10 CAD is successfully transferred from the payer system 110 to a payee system 115 for a transaction worth $5 CAD, the issuer system 105 modifies the value of the digital currency from $10 CAD to $5 CAD. This approach of modifying digital currency after use or transfer may be referred to as a daisy-chain approach to making chain.

In some other cases, the transaction system 100 may implement a direct approach of making change. This direct approach may take place prior or during a transaction. If change is requested prior to a transaction, the payer system 110 may, at its own discretion, transmit a request to the issuer system 105 to break a large-denomination token into several smaller denomination tokens. In some embodiments, the consumer's wallet application (described in more detail below) may identify that the consumer does not have optimal change (e.g. based on a review of prior transactions etc.) and notify the consumer to authorize transmission of some tokens to the issuer system 105 to be broken into smaller denominations. In yet other embodiments, the consumer's wallet application may automatically transmit a request on the consumer's behalf to the issuer system 105 for change upon determining the consumer does not have optimal change.

Alternatively, change may be requested during a transaction. In such cases, the payer system 110 selects an item on the payee system 115 for purchase and the payee system generates an invoice for the payer system 110 in return. If the payer system 110 does not have the exact change (for example, if the invoice generated by the payee system 115 shows $5, but the payer system has a $10 digital token), the payer system 110 transmits a request for the exact change to the issuer system 105. During this process, the purchase transaction with the payee system 115 may be temporarily suspended until change has been obtained from the issuer system 105. Upon obtaining change from the issuer system 105, the transaction may continue with the payer system 110 having the correct change for payment. In one example, the payer system 110 transmits the $10 token and requests two $5 tokens from the issuer system 105 and proceeds to complete the transaction with the payee system 115. In another example, the payer system 110 transmits the $10 token and the invoice issued by the payee system 115 to the issuer system 105 and receives a $5 token to store in the payer system 110 and a pre-authorized token (or a message) to present to the payee system 115 and acquirer system 120. In this example, the pre-authorized token need not be validated by the issuer system 105 to complete the transaction. The process of validation is discussed in detail below.

In some cases, the transaction system 100 may implement a system in which the payee system 115 issues the change. This scenario is analogous to a real-world situation in which a consumer provides the merchant cash for goods and/or services and receiving change back. The payer system 110 selects an item on the payee system 115 for purchase and the payee system generates an invoice for the payer system 110 in return. If the payer system 110 does not have the exact change (for example, if the invoice generated by the payee system 115 shows $5, but the payer system has a $10 digital token), the payer system 110 provides a token whose value is more than the value indicated in the invoice. In this case, the payee system 115 identifies that an excess amount has been provided by the payer system 110. The payee system 115 can mint and transfer one or more tokens corresponding to the value of change back to the payer system 110. In some cases, the payee system 115 minting the change may use an issuer system to authorize the change that is not the same as the issuer system 105 payer systems 110 used by the payer system 110. As such the payer system 110 may accumulate digital tokens authorized by a number of different issuers over time. In subsequent transactions, the payer system 110 may provide the payee system 115 digital tokens that have been authorized by a variety of different issuer systems. During payment processing, the acquirer system of 120 may be required to contact multiple issuers to validate the payment provided by the payer system 110.

In some cases, in addition to issuing change, the payee system 115 may be able to mint other forms of tokens such as proprietary tokens or equivalents that are analogous to loyalty points to incentivize consumers or payer systems 110 to make more purchases. The amount of proprietary tokens issued by the payee system 115 to the payer system 110 may be a percentage of the invoiced value, a fixed amount or a graduated amount (e.g. $5 store credit for $20). Such proprietary tokens may only be redeemable by the issuing payee system 115.

In some cases, the transaction system 100 may implement a system in which the acquirer system 120 issues the change. In such cases, the payer system 110 selects an item on the payee system 115 for purchase and the payee system generates an invoice for the payer system 110 in return. If the payer system 110 does not have the exact change (for example, if the invoice generated by the payee system 115 shows $5, but the payer system has a $10 digital token), the payer system 110 provides a token whose value is more than the value indicated in the invoice. The payee system 115 transmits the transaction to the acquirer system 120 for validation. In the present case, the acquirer system 120 can decide to issue the change instead of asking the issuer system 105 as described in previous cases. To do so, the acquirer system 120 provides additional information to the issuer system 105 along with information regarding the original transaction to indicate that the acquirer system 120 shall be issuing the change and that the issuer system 105 is merely asked to validate and record that the issuing system 105 owes the acquirer system 120 the change that the acquirer system 120 will issue. Furthermore, the issuer system would be asked to cancel the token provided by the payer system 110 to the payee system 115. Upon receipt of a confirmation from the issuer system 105, the acquirer system 120 can issue the change as part of the original transaction response process.

Reference is next made to the payer system 110 of the transaction system 100. Payer system 110 may include any networked computing device, including a processor and memory, and capable of communicating with a communication network 125. A computing device may be a personal computer, workstation, server, portable computer, mobile phone, laptop wirelessly coupled to an access point (e.g. a wireless router, a cellular communications tower, etc.), a wirelessly enabled personal data assistant (PDA) or smart phone, a terminal, a tablet computer, a game console over a wired or wireless connection, WAP phone, embedded device, smart card, or a combination of these.

Payer system 110 typically includes one or more input devices, such as a keyboard, mouse, camera, touch screen and a microphone etc., and also includes one or more output devices such as a display screen and a speaker etc. Payer system 110 also has a network interface for connecting to a communication network 125 in order to communicate with other components within the transaction system 100.

In various embodiments, payer system 110 comprises a client or a wallet which may be an application, such as a computing application, application plug-in, a widget, mobile device application, Java™ application, or web browser executed by the payer system 110 in order to send or transmit data.

The client or the wallet may include any software that runs on various platforms (e.g. on a personal computer, mobile phone, cloud environment etc.), and may be configured to communicate with the issuer system 105 over the communication network 125 to securely store digital currency, to manage the logical linkages between the payer system 110 and issuer system 105, to provide a user interface, to transfer value between linked issuer system 105 and the payer system 110, and to maintain transaction records (for example, logs and digital receipts etc.). In some embodiments, the wallet storing the digital currency and all associated data may be operated by the issuer system 105, the payer system 110 or a trusted third party (e.g. a trusted cloud computing provider).

The payer system 110 is operated by a consumer, who uses the digital currency stored in the wallet to make a purchase with the merchant or the payee system 115. In some embodiments, each payer system 110 is usable by only one consumer assigned to the payer system 110. In some other embodiments, the payer system 110 may be usable by more than one consumer where each consumer can log into his/her personalized wallet by entering identification information, such as user name and/or password etc. The multi-party wallet may be shared by members of the same family (i.e. a family wallet) or it may be a wallet that is shared by a group of people (i.e. members of a village). Such a shared or a multi-party wallet can be useful under circumstances in which it is not economical to maintain an individual wallet system. For example, individuals living in developing countries in which smartphone ownership is not economically possible may choose to use a multi-party wallet.

In yet other embodiments, the wallet can be configured with varying levels of authorizations with respect to the amounts of funds transferable by the consumer operating the wallet. The amounts may depend on the consumer's assigned credential. For example, a wallet designated for corporate expenses assigned to a low level employee (i.e. the payer system 100 being assigned credentials corresponding to an employee) may be configured to allow the employee to authorize transactions up to $500. On the other hand, executive level employees may be given the authority to authorize larger transactions. For example, VP level employees may authorize transactions up to $5000 while the CEO or CFO may authorize transactions up to $1,000,000. These transaction limits and various other policies may be managed with a manager tool which may also be configured to report on the digital credentials for each transaction. In some cases, credentials may be combined for even larger transactions. For example, the CEO and CFO combining their authorization credentials may approve transactions amounts that would otherwise be above the transaction limits granted to them individually. Similarly, the ability to apply various authorization levels may also apply to multi-party accounts. For example a family wallet may be managed by a parent so that their children may have an authorization limit that is different from those of the parents.

In some embodiments, the wallet may further be configured to store digital currency of another country. For example the wallet may be authorized by the consumer to store digital currency with values corresponding to various worldwide currencies such as British Pounds, Euros, United States Dollar, and Japanese Yen. In some cases, the wallet may further be authorized to automatically convert digital currencies from one type to another. For example, a consumer may authorize the wallet to automatically convert some or all of the currency stored in the wallet upon the wallet determining that the consumer has traveled to a country in which the local currency is not the same as the currency presently stored in the wallet. The wallet may determine the location of the consumer by accessing location data provided by data sources available to the wallet such as GPS coordinate, IP geolocation data or the merchant systems address and billing information. The wallet may deposit existing digital coins of the original currency back with the issuer system 105 and request the same amount in the currency of the new country. In some embodiments, the consumer may establish conversion rules so as to customize the manner in which currency conversions are made by the wallet. For example, the consumer may configure the wallet to convert the entire wallet balance of digital coins into the new currency; convert a fixed amount to the new currency (e.g. always convert $100 worth of Euros, Pounds, Swiss Francs etc.); or purchase a fixed amount of a foreign digital currency corresponding to the country the consumer is located add that amount to the wallet.

In some embodiments, the payer system 110 requests the issuer system 105 to issue digital currency for a requested amount. In some other embodiments, the payer system 110 mints the digital currency of desired denomination and transmits the minted currency to the issuer system 105 for authorization. The authorized digital currency is then usable by the payer system 110 for one or more transactions with one or more payee systems 115.

In various embodiments, the payer system 110 provides a user interface to the consumer operating the payer system 110. The consumer can maneuver the user interface to access various payee systems 115 and participate in a transaction with the payee systems 115.

Reference is next made to the payee system 115 of the transaction system 100. Payee system 115 may include any networked computing device, including a processor and memory, capable of communicating with a network. A computing device may be a personal computer, workstation, server, portable computer, mobile phone, laptop wirelessly coupled to an access point (e.g. a wireless router, a cellular communications tower, etc.), a wirelessly enabled personal data assistant (PDA) or smart phone, a terminal, a tablet computer, a game console over a wired or wireless connection, WAP phone, or a combination of these.

The payee system 115 may also include a merchant website, a network location, point of sale (POS) terminal, ATM terminal, or any merchant data source providing products or services and operations data associated with one or more merchants. In various embodiments, the products or services and operations data includes, but is not limited to, one or more of, data indicating the products or services offered by the potential merchant payees, data indicating the prices of the products or services offered by the potential merchant payees, data indicating the payment polices of the potential merchant payees, such as data indicating if the potential merchant payees accept cash, or provide products or services typically paid for using cash, data indicating the hours of operation of the potential merchant payees, data indicating days the potential merchant payees are closed, and/or holidays observed by the potential merchant payees, and/or any other products or services and operations data associated with the potential merchant payees available and desired, as discussed herein, and/or as known in the art at the time of filing, and/or as developed/made available after the time of filing.

The payee system 115 is operated by a merchant, who receives the digital currency from the payer system 110 in exchange for one or more products and/or services. In the various embodiments disclosed herein, the consumers use their payer system 110, and a wallet application in particular, to receive and store digital currency on a payment device such as a PC, web server, cloud-based storage, mobile phone, smart card, or PDA. In various embodiments, the payee system 115 uses an integration toolkit to connect the corresponding merchant's shop system(s) to a payment processor, and to provide an interface to accept payments from consumer wallet applications.

Reference is next made to acquirer system 120 of the transaction system 100. Acquirer system 120 may include one or more server systems that have one or more processors with computing processing abilities and memory such as a database(s) or file system(s).

Acquirer system 120 is controlled and operated by an acquirer, who is a legal entity that accepts value on behalf of the payee who controls the payee system 115. The acquirer system 120 is further configured to accept obligations to settle accounts with merchant/payee operating the payee system 115. In some embodiments, the acquirer system 120 may be configured to handle multiple types of settlements, including but not limited to, real-time RTGS, batch format and time-based batch format.

In various embodiments, the acquirer system 120 receives digital currency, transferred from the payer system 110 to the payee system 115 for a transaction, from the payee system 115, and determines the issuer system 105 that either mints the digital currency or authorizes the minted digital currency. In some cases, the acquirer system 120 may have an internal database or may be coupled to an external server that analyzes the digital currency and determines the corresponding issuer system 105.

Once the issuer system 105 corresponding to the received digital currency is determined, the acquirer system 120 transmits the digital currency to the issuer system 105 for validation. If the issuer system 105 successfully validates the digital currency, the issuer system 105 transmits the monetary value of the digital currency to the acquirer system 120. The acquirer system 120 may also receive a receipt of the transaction from the issuer system 105, which the acquirer system 120 either transmits to the payer system 110 directly or via the payee system 115.

In some cases, the acquirer system 120 may also receive change in the form of digital currency from the issuer system 105 if the amount transferred by the payer system 115 is higher than the value of the goods and/or services purchased by the issuer system 105. The acquirer system 120 either transmits the change to the payer system 110 directly or via the payee system 115.

Figure 2:
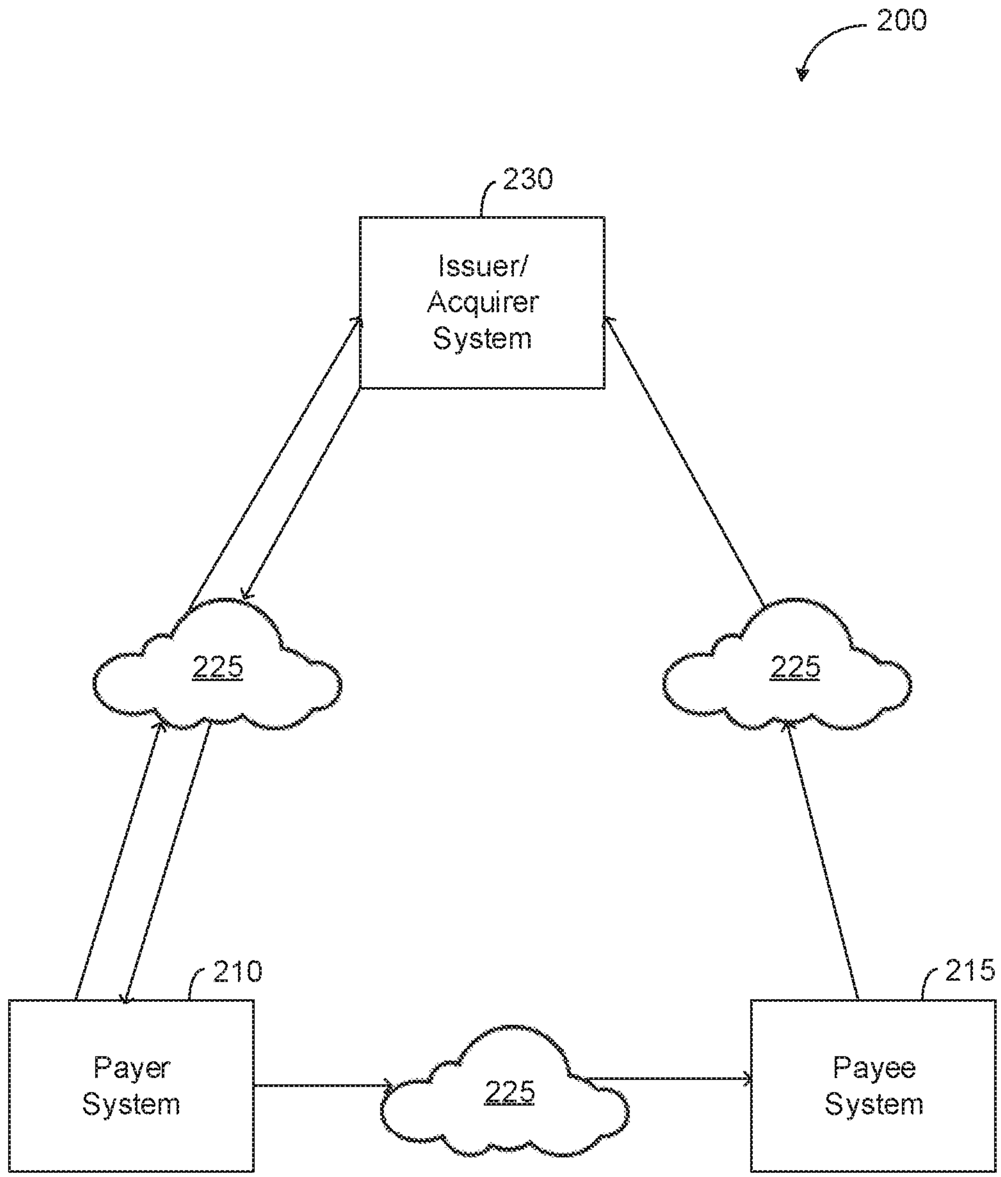
FIG. 2 is a block diagram of a transaction system in accordance with another example embodiment.

Reference is next made to FIG. 2, which illustrates a block diagram of a transaction system 200 according to an example embodiment. Transaction system 200 comprises a payer system 210, a payee system 215, a consolidated issuer/acquirer system 230 and a communication network 225. In the illustrated embodiment of FIG. 2, the payer system 210 is analogous to the payer system 110 of FIG. 1 and the payee system 215 is analogous to the payee system 115 of FIG. 1. Similarly, communication network 225 is analogous to the communication network 125 of FIG. 1.

The consolidated issuer/acquirer system 230 may include one or more server systems that have one or more processors with computing processing abilities and memory such as a database(s) or file system(s). The consolidated issuer/acquirer system 230 may have the functionality of both an issuer system, such as an issuer system 105 of FIG. 1, and an acquirer system, such as an acquirer system 120 of FIG.

Although one consolidated issuer/acquirer system 230 is shown for clarity, there may be multiple consolidated issuer/acquirer system 230 distributed over a wide geographic area and connected via e.g. communication network 225.

In this embodiment, the consolidated issuer/acquirer system 230 may be a financial institution, such as a bank or an independent third party, that stores and safeguards value for the consumer 110 as well as has the obligation to settle with the merchant or payee system 215. In some embodiments, the issuer/acquirer system 230 may be configured to handle multiple types of settlements, including but not limited to, real-time RTGS, batch format and time-based batch format. In various cases, the consolidated issuer/acquirer system 230 may be used if the financial institution issuing or authorizing minted digital currency for the payer system 210 is the same as the financial institution acquiring and handling digital currency for the payee system 215.

Figure 3:
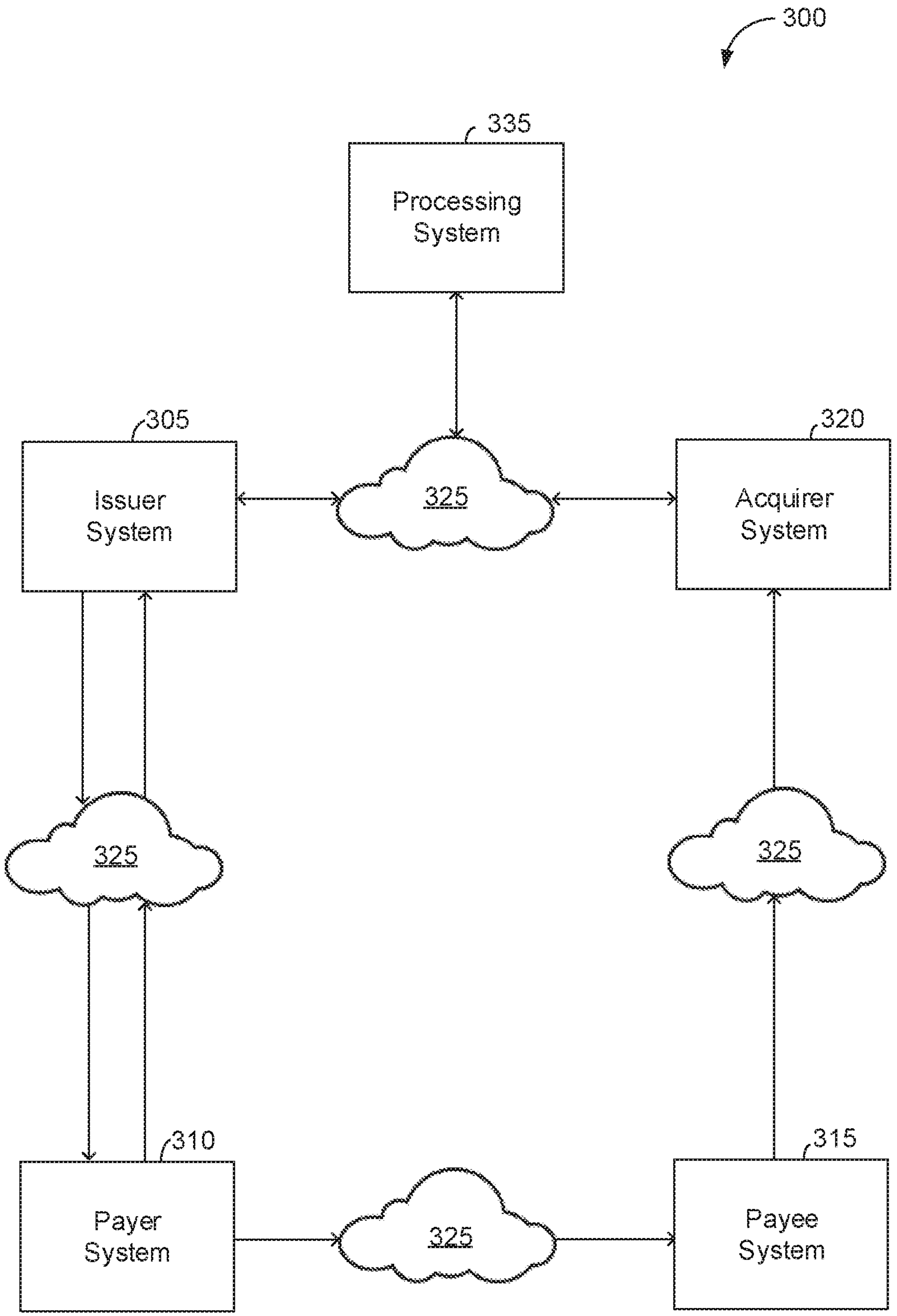
FIG. 3 is a block diagram of a transaction system in accordance with another example embodiment.

Reference is next made to FIG. 3, which illustrates a block diagram of a transaction system 300 according to an example embodiment. Transaction system 300 comprises an issuer system 305, a payer system 310, a payee system 315, an acquirer system 320, a communication network 225, and a processing system 335. In the illustrated embodiment of FIG. 3, the issuer system 305 is analogous to the issuer system 105 of FIG. 1, the payer system 310 is analogous to the payer system 110 of FIG. 1, the payee system 315 is analogous to the payee system 115 of FIG. 1 and the acquirer system 320 is analogous to the acquirer system 120 of FIG. 1. Similarly, communication network 325 is analogous to the communication network 125 of FIG. 1.

Processing system 335 may include one or more server systems that have one or more processors with computing processing abilities and memory such as a database(s) or file system(s). Although one processing system 335 is shown for clarity, there may be multiple processing systems 335 distributed over a wide geographic area and connected via e.g. communication network 325.

The processing system 335 may be configured to facilitate communication between the issuer system 305 and the acquirer system 320. In some embodiment, the processing system 335 may have a database or a look-up table that enables the acquirer system 320 to identify the relevant issuer system 305 that either minted the digital currency or authorized the digital currency transferred from the payer system 310 to the payee system 315 during a transaction.

Figure 4:
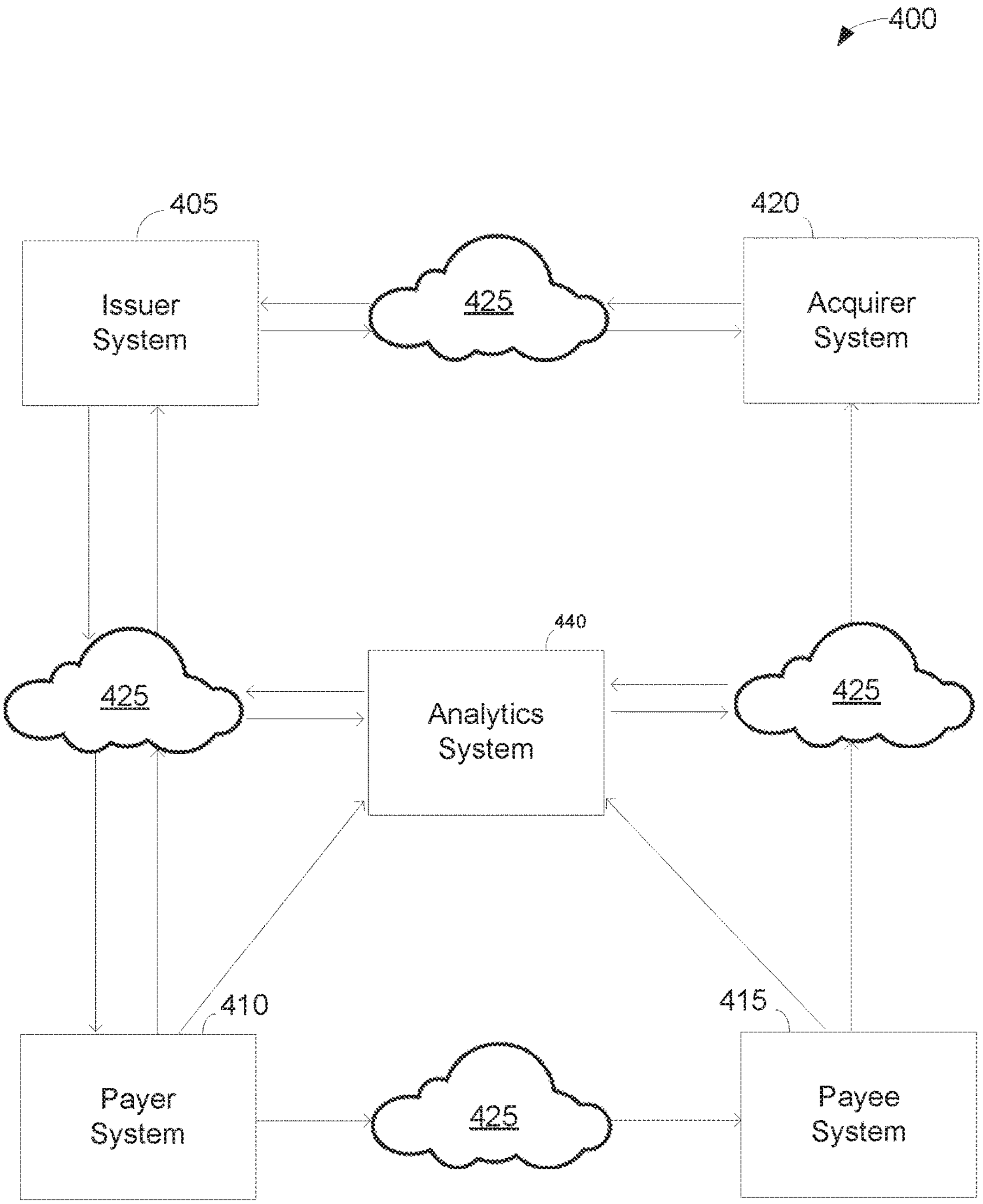
FIG. 4 is a block diagram of a transaction system in accordance with another example embodiment.

Reference is next made to FIG. 4, which illustrates a block diagram of a transaction system 400 according to an example embodiment. Transaction system 400 comprises an issuer system 405, a payer system 410, a payee system 415, an acquirer system 420, a communication network 425, and an analytics system 440. In the illustrated embodiment of FIG. 4, the issuer system 405 is analogous to the issuer system 105 of FIG. 1, the payer system 410 is analogous to the payer system 110 of FIG. 1, the payee system 415 is analogous to the payee system 115 of FIG. 1 and the acquirer system 420 is analogous to the acquirer system 120 of FIG. 1. Similarly, communication network 425 is analogous to the communication network 125 of FIG. 1.

The analytics system 440 may include one or more server systems that have one or more processors with computing processing abilities and memory such as a database(s) or file system(s). Although one analytics system 440 is shown for clarity, there may be multiple analytics systems 440 distributed over a wide geographic area and connected via e.g. communication network 425.

The analytics system 440 may be configured to facilitate communication between the payer system 410 and the payee system 415. In some embodiment, the analytics system 440 may be a big data server that stores personal information about the customers operating the payer system 410. In some embodiments, the analytics systems may be operated by the payee system 415, the acquirer system 420, the issuer system 405, a third party system (not shown), or jointly operated by one or more of these systems. In various cases, the analytics system 440 may provide a choice to the customers operating the payer system 410 to release their personal information. In return, the analytics system 440 may make available other benefits to the customers operating the payer system 410, such as free digital currency, a free gift in the form of a good or a service, access to analytics information such as customer's expenses, patterns and/or habits etc. In such circumstances, the analytics system 440 may be configured to mint digital currency and distribute digital currency to customers operating the payer system 410.

In some embodiments, the analytics system 440 may also store personal information about various payee systems 415. In some cases, the analytics system 440 may provide a choice to the merchants and/or banks operating the payee systems 415 to release their personal information. In return, the analytics system 440 may make available other benefits to the merchants and/or banks operating the payee systems 415. Such benefits may include access to analytics information, such as, for example, access to customers of other merchants, sales data regarding goods and/or services offered by the payee system 415, correlation data correlating the goods and/or services offered by the payee system 415 and the age, gender, geographical location and/or monetary status (among other factors) of the corresponding customers purchasing the goods and/or services.

In some embodiments, the analytics system 440 may maintain a database of loyalty points (or other indicia of rewarding repeat customers) for the customers based on their interaction with one or more payee systems 415 operated by one or more merchants. In some other embodiments, the loyalty points themselves may be stored with the payer system 410. For example, the loyalty points may be stored either locally within the wallet application of the payer system 410 (e.g. on the smart phone controlled by the consumer), in the cloud controlled by either the issuer system 405 or the payer system 410, or a hybrid version where the loyalty points are stored both locally and in the cloud. In various cases, the digital tokens can also be stored either within the device controller by the consumer (e.g. wallet application on payer's smart phone), in the cloud controlled by either the issuer system 405 or the payer system 410, or a combination of these.

In some embodiments, the analytics system 440 may be used to facilitate the determination of optimal token denominations to be generated by the issuer system 405 when requested by payer system 410 or when the payer system 410 mints its own token denominations for use. Efficiency of the payment system may be enhanced if the payer system 410 has the correct amount of tokens for any given transaction. For example, if the payer system 410 has the correct change for any given transaction then fewer steps may be required to complete the transaction, since change is not required by the payer system 410 if the exact amount on the invoice is initially paid to the payee system 415.

The optimization may be based on examining the user behaviors, using data provided by the analytics system 440, at various levels of generality, including 1) the general population (i.e. all users of the payment system); 2) specific groups of the general population (i.e. certain populations having specific spending habits), determinable by applying various heuristic or analytic frameworks or filters to user data corresponding to the general population; or 3) specific individuals (i.e. targeted behavioral analysis of identified users). Analytic or behavioral data for optimizing token denominations may be provided by the analytic system 440 in an on-demand basis to the payer system 405 or the issuer system 410. Alternatively, the analytic system 440 may provide optimization information to the issuer system 405 or payer system 410 on a fixed schedule (e.g. hourly, daily, weekly or monthly etc.).

For example, a consumer "A" frequently purchases news articles for $0.01, and reads about 25 articles per day. Consumer "B" prefers to continuously download/stream music online, in which each title with a cost of $0.05. Consume "C" prefers online gaming and regularly spends multiples of $0.10 on in-game purchases. All three consumers partake in different transactions and they may also to have different withdrawal preferences. For instance, consumer "A", "B" and "C" tends to withdraw $10, $20 and $50 respectively. Furthermore, each consumer's spending frequency may also be different. The data of each consumer A, B and C along with the collective data of other consumers may also provide insight into various categories of users, such as those who spend a lot (e.g. consumer C) or those who spend frequency (e.g. consumer B) as well as help identify the spending trends of the population group as a whole. Overtime, the cumulative data collected by the analytics system 404 for the consumers may be used to generate denomination optimization data against which a given individual person's actual recorded transaction data is compared to determine set of token denomination optimized for that particular individual. In some embodiments, under circumstances in which the issuer system 405 or payer system 410 cannot obtain optimization data from the analytics system 440, these systems may implement its own default optimization policies. Similarly, if a user is a newly registered user and not enough analytics data has been collected on the spending habits of that user, such default policies may also be applied until a more transaction data has been obtained.

Figure 5:
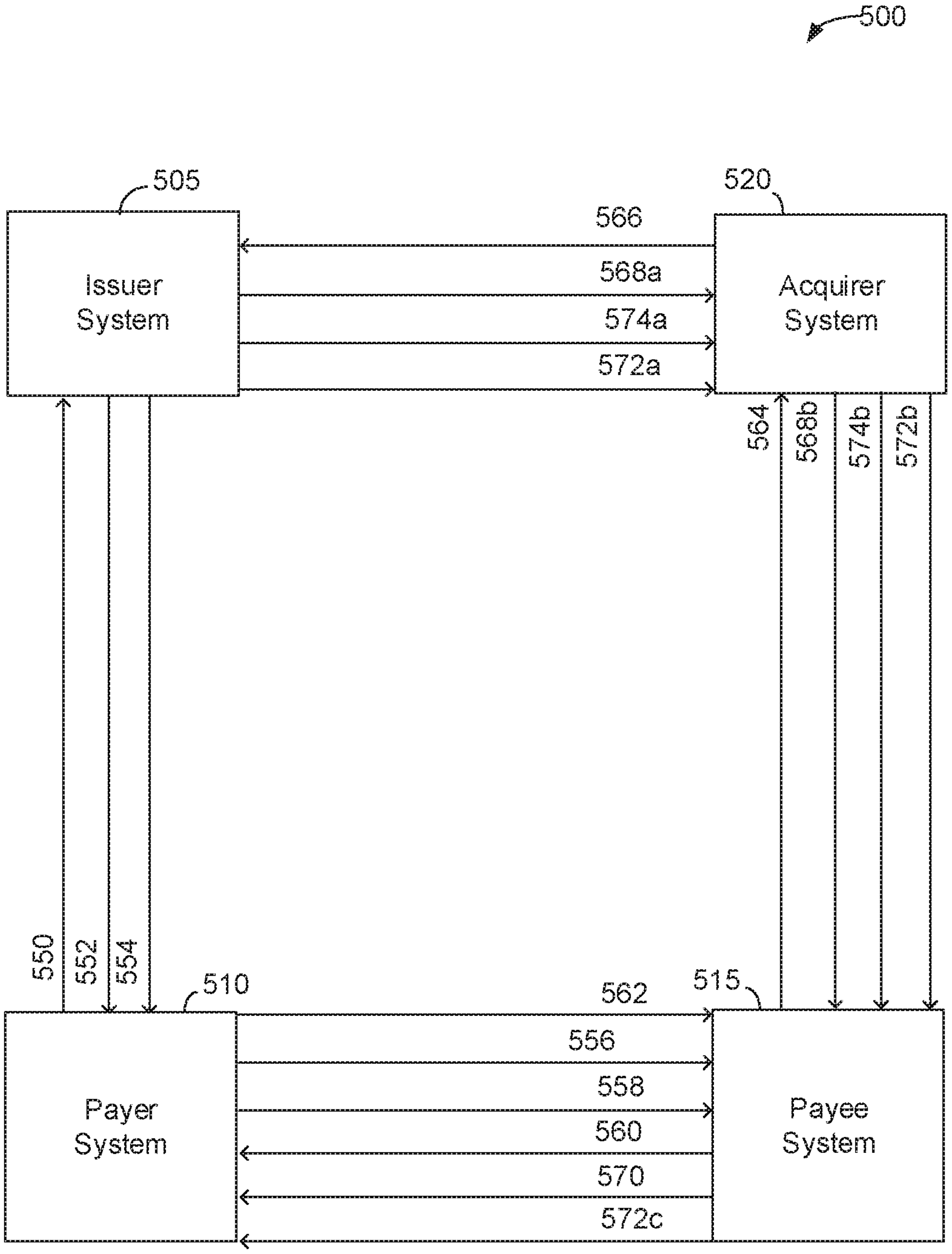
FIG. 5 illustrates a data flow within a transaction system in accordance with an example embodiment.

Reference is next made to FIG. 5, which illustrates a data flow within a transaction system 500 according to an example embodiment. Transaction system 500 comprises an issuer system 505, a payer system 510, a payee system 515, an acquirer system 520 and a communication network 525. In the illustrated embodiment of FIG. 5, the issuer system 505 is analogous to the issuer system 105 of FIG. 1, the payer system 510 is analogous to the payer system 110 of FIG. 1, the payee system 515 is analogous to the payee system 115 of FIG. 1 and the acquirer system 520 is analogous to the acquirer system 120 of FIG. 1. Similarly, communication network 525 is analogous to the communication network 125 of FIG. 1. In the illustrated embodiment, the communications network 525 is based on Internet Protocols ("IP"). The transport can be over private or public IP networks.

The transaction system 500 is a payment network which supports circulation of digital currency and relies on authenticating digital currency instead of payers or consumers participating in the transaction. The digital currency used in the various embodiments disclosed herein comprises a value-bearing instrument storable on a device. In various embodiments, the digital currency includes an encrypted token-based digital cash. From a consumer's perspective, the digital currency is immediate, anonymous and final. The digital currency used in the various embodiments disclosed herein can be provided and accepted by many payee systems 115, issuer systems 105 and acquirer systems 120.

In the illustrated embodiment, at 550, the consumer operating the payer system 510 obtains the wallet software from the issuer system 505. In some other cases, the wallet software may be obtained by the payer system 510 from some source other than the issuer system 505. For example, the payer system 510 may obtain the wallet application from any online digital media stores, such as iTunes, Google Play etc.

At 552, the consumer operating the payer system 510 links the wallet application to an account at the issuer system 505. As previously mentioned, the issuer system 505 maintains records of a plurality of consumers, where each record includes an account identifier of the corresponding consumer. The account identifier refers to an account of the consumer, which may be a combination of a physical and an electronic account, storing real or virtual currencies, commodities, stocks, value cards etc. owned by the consumer.

By linking the wallet application at the payer system 510 to the account at the issuer system 505, the consumer can access the currencies and/or commodities etc. stored or accessible by the issuer system 505 during transactions. In various embodiments disclosed herein, the connection of the wallet application with the account is only necessary for awareness regarding the value of the consumer's account. This knowledge regarding the value of the consumer's account is usable by the issuer system 505 for validating the digital currency minted by the wallet application, as discussed below.

At 554, the payer system 510 receives the digital currency from the issuer system 505. The digital currency is usable by the payer system 510 for transactions with the one or more payee systems 515 or the merchants. Once the digital currency is received by the payer system 510, the digital currency is stored in the memory of the payer system 510. The digital currency may reside on the payer's device (e.g. mobile phone, smart card etc.) or it may reside in the cloud (under the control of the payer, issuer, operator or any combination thereof) or it may reside in both simultaneously (payer device and cloud).

In various embodiments, the wallet application of the payer system 510 mints tokens. In some cases, the tokens are minted for pre-determined denominations of currency. In some other cases, the tokens are minted for the exact change as required by the payer system 510. Once the tokens are minted by the payer system 510, the tokens are transmitted to the issuer system 505 for validation. Only the validated tokens are usable by the payer system 510 for transactions.

In some other embodiments, the issuer system 505 mints the tokens itself based on a request from the payer system 510. In such cases, the issuer system 505 may mint the exact denomination of tokens as requested by the payer system 510. In some other cases, the issuer system 505 may mint the requested amount in some combination of pre-determined denominations. Once the tokens are minted by the issuer system 505, validation may or may not be required. The minted and/or the validated tokens are then transmitted to the payer system 510 for transactions.

At 556, the consumer operating the payer system 510 accesses the merchant or payee system 515 to browse the merchant's goods and services and potentially make a purchase of one or more goods and services. The payer system 510 and the payee system 515 may be located in close proximity to each other, or may be remote from each other.

Once the consumer identifies the goods and/or services the consumer wants to purchase, at 558, the consumer typically goes to the checkout and selects a payment method. The checkout may be an electronic checkout, such as on a website, or a physical checkout location at a physical merchant location.

At 560, upon detecting the consumer's interest in purchasing the goods and/or services, the payee system 515 generates an invoice identifying the amount owed to the merchant. The invoice may also identify the goods and/or services being purchased. The payee system 515 may also transmit the invoice to the customer.

At 562, the consumer approves payments and the required amount is transmitted from the payer system 510 to the payee system 515. In the embodiments disclosed herein, the consumer makes the payment using the digital tokens.

In some embodiments, step 554 may occur after step 560, where the tokens are received from the issuer system 505 by the payer system 510 only after receiving a digitally signed invoice from the payee system 515. Once the digitally signed invoice is received by the payer system 510, the payer system 510 either mints the required tokens itself or requests the issuer system 505 to do so. The minted tokens may then be validated by the issuer system 505 before they can be used.

At 564, once the payment tokens are transmitted from the payer system 510 to the payee system 515, the payee system 515 transmits the payment tokens and the invoice to the acquirer system 520. The payment tokens and the invoice are transmitted to the acquirer system 520 for deposit of the currency to merchant's account. The transfer of funds to the merchant's account in this manner may be regarded as a "pull" transaction, in which the acquirer system 520 associated with the merchant pulls funds from the issuer associated with the payer system 510. In other cases, the system may also support transactions regarded be a "push" transaction, in which the payer system 510 deposits or pushes funds to the account of the payee system 515. For example, the payee system 515 may be a charity and the payer system may be associated with a donor wishing to transfer funds to the charity. In this case, funds may be pushed from the payer system 510 to the payee system 515 using the similar methods described herein. In some embodiments, whether the transaction is a push or a pull transaction, the transmission of information such as the invoice may be made in an unencrypted manner (i.e. in the clear). In other cases, the transmission of transaction information is made over an encrypted communication channel. In yet other cases, the transaction information may be encrypted within the payment token itself.

At 566, the acquirer system 520 determines the issuer system 505 or the issuer corresponding to the payment tokens received from the payee system 515. Upon determining the corresponding issuer system 505, the acquirer system 520 transmits the payment tokens to the issuer system 505 for verification.

Next, the issuer system 505 verifies the payment tokens received from the acquirer system 520 and transmit the results of the verification to the acquirer system 520 at **568*a* and the payee system 515 at 568*b*. Upon receiving the payment tokens from the acquirer system 520, the issuer system 505 verifies if the payment tokens were either minted and/or validated by the issuer system 505**.

For example, in the embodiments where the tokens are minted by the payer system 510 and validated by the issuer system 505, the issuer system 505 verifies that the payment tokens were authorized for use by the issuer system 505. In the embodiments where the tokens are minted and/or validated by the issuer system 505, the issuer system 505 verifies that the payment tokens were minted and/or validated by the issuer system 505. In the embodiments where the tokens are minted by the issuer system 505 and payer system 510 in combination, the issuer system 505 validates the tokens.

Once the issuer system 505 verifies that the payment tokens received from the acquirer system 520 were validated and/or minted by the issuer system 505, the issuer system 505 transmits the results of the verification are transmitted to the acquirer system 520 and the payee system 515. In various cases, the verification result is transmitted to the payee system 515 via the acquirer system 520.

In cases where the issuer system 505 confirms that the payment tokens were validated and/or minted by the issuer system 505, the verification result contains an approval to this effect. On the other hand, if the issuer system 505 cannot confirm that the payment tokens were validated and/or minted by the issuer system 505, the verification result contains indicia of error to this effect.

If the verification result contains an approval by the issuer system 505, at 570, the payee system 515 transmits a receipt to the payer system 510 acknowledging the verified status of the payment tokens and completion of the transaction. Also at 570, the goods and/or services are delivered to the consumer, where the delivery may be instantaneous or delayed in time. In most cases, the receipt is digitally signed and legally valid.

In some cases, where the payment tokens are not the exact amount of the goods and/or services and change is owed to the payer system 510, the payee system 515 may also transmit the appropriate change to the payer system 510 at 572*c*. In the various embodiments disclosed herein, the change is also a digital currency analogous to the payment token and is generated by the issuer system 505. The change is then transmitted from the issuer system 505 to the acquirer system 520 at 572*a*, which is then transmitted from the acquirer system 520 to the payee system 515 at 572*b*. The payer system 510 may either store the change token locally or transmit it to the issuer system 505. In some embodiments, the payee system 515 (i.e. the merchant) may also be able to provide change, for example, by minting digital currency in the method described above and transmitting the appropriate change back to the payer system 510 either directly or indirectly (i.e. through the acquirer system 520).

Next, at 574*a*, the issuer system 505 pays the acquirer system 520 the value of the goods and/or services purchased by the payer system 510. The value paid to the acquirer system 520 may be an electronic transfer of real currency. Similarly, at 574*b*, the acquirer system 520 pays the payee system 515 the appropriate amount using available settlement facilities. For example, the acquirer system 520 deposits the appropriate real currency in the bank account of the payee system 515.

Figure 6A:
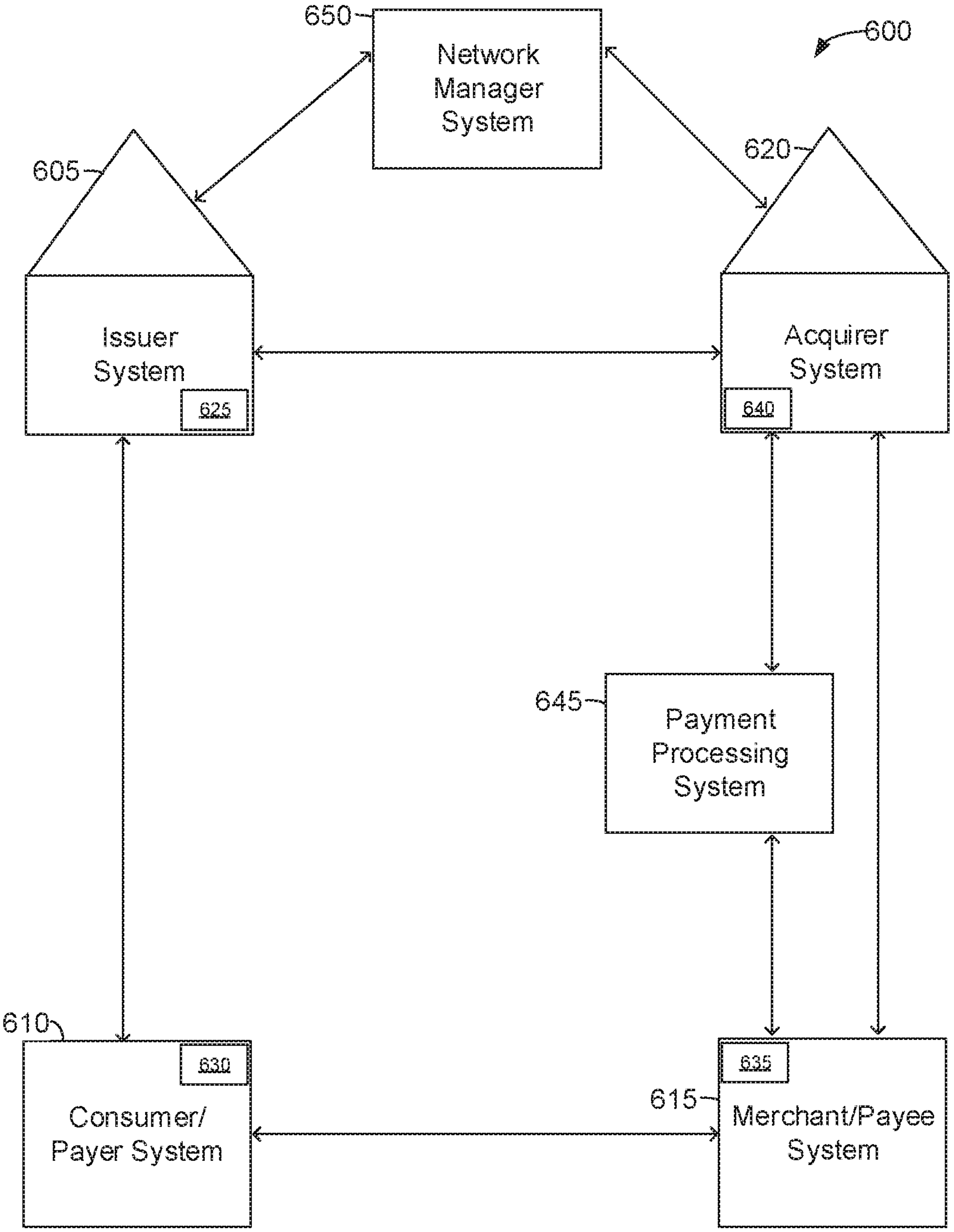
FIG. 6A illustrates a block diagram of a transaction system in accordance with an example embodiment.

Reference is next made to FIG. 6A, which illustrates a block diagram of a transaction system 600 according to an example embodiment. Transaction system 600 comprises an issuer system 605, a consumer/payer system 610, a merchant/payee system 615, an acquirer system 620, a payment processing system 645 and a network manager system 650. Furthermore, in the illustrated embodiment, the issuer system 605 comprises an issuer control system 625, the consumer/payer system 610 comprises a payer control system 630, the merchant/payee system 615 comprises a payee control system 635, and the acquirer system 620 comprises an acquirer control system 640.

In the illustrated embodiment, the issuer system 605 comprising the issuer control system 625 corresponds to an issuer system as discussed herein, such as the issuer system 105 of FIG. 1. Similarly, the payer system 610 comprising the payer control system 630 corresponds to a payer system discussed herein, such as the payer system 110 of FIG. 1, the payee system 615 comprising the payee control system 635 correspond to a payee system discussed herein, such as the payee system 115 of FIG. 1, and the acquirer system 620 comprising the acquirer control system 640 correspond to an acquirer system discussed herein.

In the illustrated embodiment, the issuer control system 625, the payer control system 630, the payee control system 635, the acquirer control system 640, the payment processing system 645 and the network manager system 650 are server systems have one or more processors with computing processing abilities and memory such as a database(s) or file system(s).

In the illustrated embodiment, the issuer system 605, the consumer/payer system 610, the merchant/payee system 615 and the acquirer system 620 may be third party systems that are provided, organized and/or maintained by third parties. As previously mentioned, the issuer system 605 and the acquirer system 620 may be financial institutions, such as, for example, banks.

In various embodiments, the issuer system 605 is any financial institution or any other legal entity that is authorized to either create or authorize a minted digital currency for use within the transaction system 600. The issuer control system 625 is the software stack that enables a financial institution to actually create or mint a digital currency, and/or to authorize the minted digital currency. The issuer control system 625 provides an additional functionality to the issuer system 605 whereby the issuer system 605 modifies or cancels the value associated with the digital currency to complete the transaction.

The issuer control system 625 is also configured to validate the digital currency used within the transaction system 600 to indicate a successful transaction. In various embodiments, the issuer control system 625 validates the digital currency by confirming that the digital currency received from the acquirer system 620 was either initially minted or authorized for use by the issuer control system 625.

In various embodiments, the acquirer system 620 may be any legal entity that can accept value on behalf of the payee or the merchant. In one example, the acquirer system 620 is the merchant's bank. The acquirer control system 640 is the software stack that enables the acquirer system 620 to accept digital currency on behalf of a payee/merchant. The acquirer control system 640 may also validate the digital currency or validate instructions from the payee system 615 to exchange digital currency. The acquirer control system 640 further allows the acquirer system 620 to obtain digital currency from the issuer system 605 corresponding to the customer system 610 who has participated in a transaction with a payee system 615, and accordingly, settle with the issuer system 605 on behalf of the payee system 615. In some cases, the issuer system 605 may operate both as an issuer and acquirer system 620, rather than being two separate systems. Under this configuration, the combined issuer and acquirer system may perform the functions of both systems.

In the various embodiments illustrated herein, the consumer system 610 has an agency contractual relationship with the issuer system 605, where the issuer system 605 holds funds for the one or more consumers operating the consumer system 610. As previously mentioned, the consumer system 610 may be any computing device that provides a user interface for the one or more consumers operating the consumer system 610 enabling the consumers to participate in a transaction with a merchant system 615.

The payer control system 630 is a software stack that enables a consumer system 610 to participate in the transaction system 600. In some embodiments, the payer control system 630 may be downloaded onto the consumer system 610, either from a website, an application store (such as, for example, iTunes, Google Play etc.), or via another source (such as, for example, a CD ROM, a USB device, an external hardware etc.). In various embodiments illustrated herein, the payer control system 630 may be any web application or any program that runs in a web browser. The payer control system 630 may be created in a browser-supported programming language (such as the combination of JavaScript, HTML and CSS etc.) and rely on a web browser to render the application.

In various embodiments, the payer control system 630 mints or generates a digital currency for use within the transaction system 600. The payer control system 630 may mint the digital currency at a pre-determined frequency or whenever desired for a transaction. In most cases, the minted digital currency by the payer control system 630 is only ready for use within the transaction system 600 after the digital currency is authorized by the issuer system 605, as discussed above. The payer control system 630 is further configured to store the minted and authorized digital currency, and participates in a transaction with the merchant system 615.

In the various embodiments illustrated herein, the payee control system 635 has an agency contractual relationship with the acquirer system 620, where the acquirer control system 640 comprised in the acquirer system 620 is configured to validate, accept and redeem representations of value held by the digital currency.

In various embodiments illustrated herein, the payee control system 635 facilitates a web based transaction system for the merchant system 615, such as, for example, by providing a web-based "shopping cart" application which interacts with the consumer's browser to enable web-based purchasing. The payee control system 635 is further configured to document the goods and/or services purchased by the consumer system 610 and manage the delivery of the purchased items to the consumer operating the consumer system 610. In some instance the transaction system 600 supports transactions at a physical location. For example, the purchase may take place at a retail store in which payment may be supported by a number of methods including, but not limited to point of sale (POS) terminal, nearfield communication (NFC), and machine readable codes (e.g. QR codes, or bar codes), the process being facilitated using an appropriate communication protocol including, but not limited to, BlueTooth, iBeacons and infrared. As such, the payee control system 635 may further be configured to document the goods and/or services purchased by the consumer 610 at the physical location.

The payee control system 635 is also configured to forward the digital currency received from the consumer system 610 to the acquirer system 620. In some cases, the payee control system 635 also forwards a receipt of the transaction between the consumer system 610 and the merchant system 615 to the acquirer system 620.

The payee control system 635 additionally receives value for the digital currency exchanged during the transaction from the acquirer system 620. In most cases, the value is only received for successfully completed transactions.

In the various embodiments illustrated herein, the payment processing system 645 may be configured to provide a functional interface between the merchant system 615 and the acquirer system 620. In some cases, the payment processing system 645 may be integrated with the merchant system 615. In some other cases, the payment processing system 645 may be integrated with the acquirer system 620.

The payment processing system 645 may be configured to sign-up merchants operating the merchant systems 615 and manage the exchange of digital currency from the merchants to the respective acquirer systems 620. For instance, the payment processing system 645 may be configured to receive the digital currency used in a transaction from the merchant system 615, and identify the acquirer system 620 corresponding to that merchant system 615. Once identified, the payment processing system forwards the digital currency to the acquirer system 620 for settlement with the issuer system 605.

In the various embodiments illustrated herein, the network manager system 650 may be configured to define, maintain and enforce payment system rules. In various cases, the network manager system 650 maintains a database of issuer systems 605 and acquirer systems 620, and facilitates the discovery of issuer system 605 with which the acquirer system 620 is required to engage is settlement once digital currency is received.

In the illustrated embodiment of FIG. 6A, in some cases, all the components of the transaction system 600 are located within a same geographical parameter, such as a same country. In such cases, the issuer system 605 and the acquirer system 620 may be financial institutions within the same country, and accordingly operate using the same currency. In such cases, the issuer control system 625 and the acquirer control system 640 need not account for currency conversions and exchange rates.

In some other cases, the issuer system 605 and the acquirer system 620 may be financial institutions located within different countries, and accordingly operate using different currencies. In such cases, the issuer control system 625 and the acquirer control system 640 may be configured to account for currency conversions and exchange rates.

In some cases, the consumer system 610 and the merchant system 615 may be located in geographically different locations, such as different countries. In such cases, the merchant control system 635 may be configured to identify the geographical location of the consumer control system 630 engaging in a transaction with the merchant system 615, and display prices for various goods and services in the currency of operation of the country within which the consumer control system 630 is detected to be located.

In some cases, the issuer system 605 may be a central bank or a reserve bank of a country. In some other cases, the issuer system 605 may be a local bank and the transaction system 600 may have a central bank overlooking the issuing and/or authorization of digital currency, and validation of digital currency within the transaction system 600. In such cases, the local issuer system 605 may relay the request of the consumer system 610 to issue and/or authorize minted digital currency to a central bank, and forward the minted and/or authorized minted digital currency from the central bank to the consumer system 610. Similarly, in such cases, the local issuer system 605 may relay the request to validate the digital currency during a transaction from the acquirer system 620 or the network manager system 650 to the central bank, and forward the result of the validation to the acquirer system 620 or the network manager system 650.

Figure 6B:
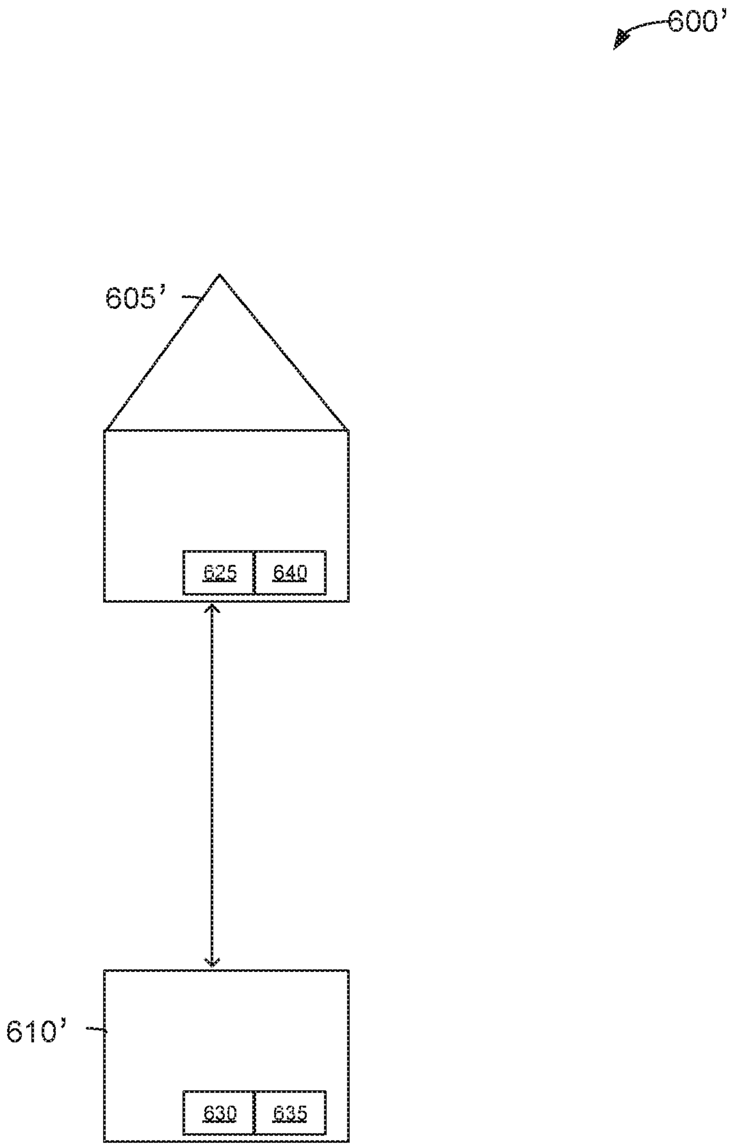
FIG. 6B illustrates a block diagram of a transaction system in accordance with another example embodiment.

Reference is next made to FIG. 6B, which illustrates a block diagram of a transaction system 600' according to another example embodiment. The transaction system 600' is analogous to the transaction system 600 of FIG. 6A, with the exception that the transaction system 600' only comprises a consolidated issuing system 605' and a consolidated purchasing system 610'.

In the illustrated embodiment, the consolidated issuing system 605' is analogous to and comprises the functionality of both the issuer control system 625 and the acquirer control system 640 of FIG. 6A. Similarly, the consolidated purchasing system 610' is analogous to and comprises the functionality of both the consumer control system 630 and the acquirer control system 635 of FIG. 6A.

In the embodiment of FIG. 6B, the consolidated issuing system 605' may function as an issuer system 605 of FIG. 6A in some cases and an acquirer system 620 of FIG. 6A in some other cases. Similarly, the consolidated purchasing system 610' may function as a consumer system 610 of FIG. 6A in some cases as well as a merchant system 615 of FIG. 6A in some other cases.

Reference is again made to FIG. 1, illustrating a block diagram of a transaction system 100. In some embodiments, the transaction between the payer system 110 and the payee system 115 may occur off-line. In such embodiments, communication network 125 may either be temporarily offline, or the transaction system 100 may be located in a geographical region with no connectivity between the components of the transaction system 100, either temporarily or permanently. In some other cases, the off-line mode can be entered into if the communication network 125 comprises Bluetooth technology, QR code technology etc.

In the off-line mode, the transaction between the payer system 110 and the payee system 115 occurs to the extent that the payer system 110 and the payee system 115 maintain a record of the goods and/or services the consumers are interested in purchasing, and payer system 110 transfers the appropriate digital currency to the payee system 115.

In some embodiments in the off-line mode, the payee system 115 may be configured to at least detect those digital tokens that have been previously cancelled or modified. In some other embodiments in the off-line mode, the payee system 115 simply stores the digital tokens until the transaction system 100 is back online, upon which the digital tokens are validated according to the discussion above.

In some embodiments, the payer system 110 and the payee system 115 may initiate the transaction by using Bump technology, or any other type of technology for initiating transfer of data.

Figure 7:
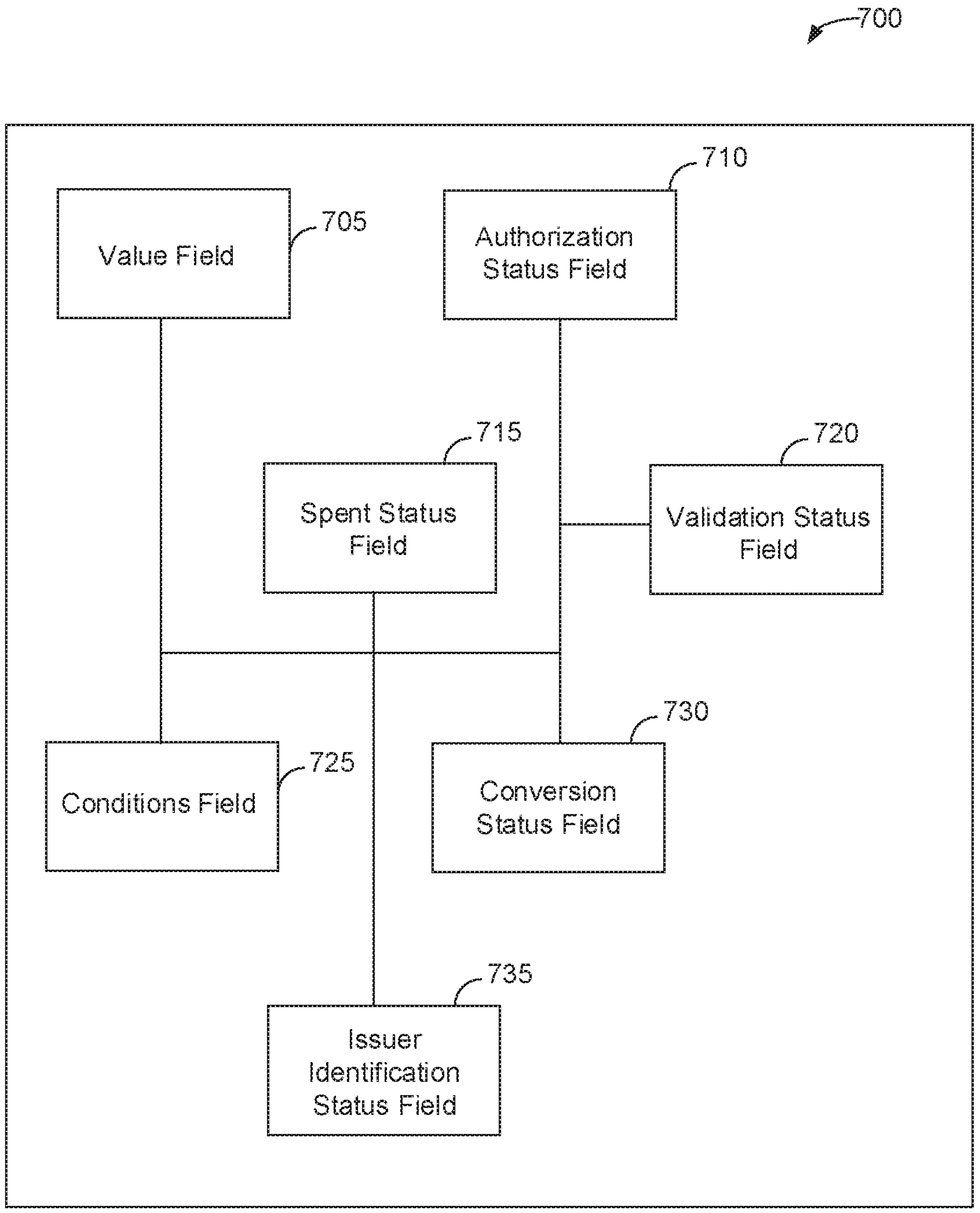
FIG. 7 illustrates a block diagram of a digital currency in accordance with an example embodiment.

Reference is next made to FIG. 7, which illustrates a block diagram of a digital currency or a digital token 700 according to an example embodiment. As discussed above, the digital token 700 is a cryptocurrency generated or created using cryptography. The digital token 700 may be regulated or unregulated digital money.

In the embodiment of FIG. 7, the various fields of a digital token 700 are illustrated according to an example embodiment. Field 705 corresponds to the value of the digital currency. As discussed above, the digital currency 700 may be minted and issued to have any denomination. For example, digital currency 700 may have any value, such as, for example, a value of 5.00, 5.75, 5.23, 0.13 etc. in any currency.

Field 710 corresponds to the authorization status of the digital currency 700. This may be an optional field in the embodiments where the digital currency is minted by the issuer system, such as the issuer system 105 of FIG. 1. In embodiments, where the digital currency is minted by the payer system, such as the payer system 110 of FIG. 1, the digital currency 700 can only be used within the transaction system if it is authorized by the issuer system. In such embodiments, the authorization status field 710 of the digital currency 700 identifies whether or not the digital currency 700 has been authorized for use within the transaction system by the issuer system.

Field 715 corresponds to the spent status of the digital currency 700. The spent status field 715 identifies an 'unspent' status if the digital currency 700 has not been used previously within the transaction system. The spent status field 715 identifies a 'spent' status if the digital currency 700 has been previously used within the transaction system. In the latter case, a digital currency 700 indicating a 'spent' status will not be legally usable within the transaction system.

Field 720 corresponds to the validation status of the digital currency 700. In most cases, once the digital currency 700 is validated by the issuer system during a transaction within the transaction system, the validation status field 720 of the digital currency 700 is set to 'validated' to indicate that the digital currency 700 was in good standing. The 'validated' status also indicates that the transaction has been successful and that the merchant can transfer the purchased goods and/or services to the customer.

Field 725 corresponds to conditions governing the use of the digital currency 700. In various embodiments, the use of the digital currency 700 may be restricted by including conditions within the conditions field 725 of the digital currency 700. The conditions field 725 may include conditions based on the goods and/or services being purchased by the consumer using the digital currency 700. For example, the digital currency 700 may include a condition that prevents the use of the digital currency 700 to buy illegal goods and/or services, such as drugs, firearms etc. In another example, the digital currency 700 may include a condition that prevents an underage customer to purchase alcohol, cigarettes etc. In this example, the condition field 725 may include a condition that the digital currency 700 can only be used by somebody over the legal age for the respective country where the transaction is being undertaken.

In some cases, the digital currency 700 is minted and/or authorized once the transaction has been initiated by, for example, the user selecting the goods and/or services for purchase. In such cases, the conditions field 725 may include the exact nature of the goods and/or services for which the digital currency 700 can be used, thereby preventing the use of the digital currency 700 for an unrelated transaction.

Field 730 corresponds to the conversion status of the digital currency 700. Conversion status field 730 indicates if the digital currency 700 has been previously modified or converted from one currency to another. For example, if a digital currency 700 of a higher denomination was used in a transaction for goods and/or services worth a lower value, then the digital currency 700 may be modified to reflect the balance of the value. In such scenarios, the conversion status field 730 may be configured to indicate the nature of modification made to the digital currency 700.

Similarly, if the digital currency 700 was issued in a first currency but was later converted into a second currency for use in, for example, a different country than the country of initial issuance, the conversion status field 730 may be configured to indicate the nature of conversions made to the digital currency 700.

Field 735 corresponds to the issuer identification status for the digital currency 700. The issuer identification status 735 indicates the issuer system that either minted or authorized the digital currency for use within the transaction system. The issuer identification status is useful to identify the issuer identification for the validation process.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. The scope of the claims should not be limited by the preferred embodiments and examples, but should be given the broadest interpretation consistent with the description as a whole.

The invention claimed is:

1. A computer-implemented method performed by one or more computing devices for improving transaction processing efficiency across an identity-agnostic distributed transaction environment based on digital token value change, the distributed transaction environment comprising a payer system, a payee system and two or more issuer systems, the method comprising:

receiving a first token request, at a first computing device corresponding to a first issuer system, for a first digital token and a second token request, at a second computing device corresponding to a second issuer system, for a second digital token, the first and the second token requests being issued by the payer system, and the first and the second digital tokens to be used in one or more transactions between the payer system and the payee system;

operating the first computing device to mint the first digital token using a first cryptographic protocol, the first digital token being decoupled from an identity of a customer operating the payer system, the first digital token being provided based on availability of funds for the payer system transmitting the first token request, the first digital token comprising a first field-based structure including: a first issuer identification status field that uniquely identifies the first computing device as an entity minting the first digital token, a first token value field that identifies a value associated with the first digital token where the value is recognizable by the payer system and the payee system, a first authorization status field set to indicate that the first digital token is authorized for use in the distributed transaction environment, a first spent status field indicating whether the first digital token has been used previously within the distributed transaction environment, the first spent status field being set to one of a spent status or an unspent status to indicate whether the first digital token is consumed previously, and a first validation status field configurable to indicate a validated status in response to the first digital token being validated by the first computing device within the distributed transaction environment;, a first conditions field defining a first conditions set governing permitted use of the first digital token, and a first conversion status field indicating whether the first digital token has been previously modified;

transmitting, from the first computing device, the first digital token to the payer system for storage on the payer system;

operating the second computing device to mint the second digital token using a second cryptographic protocol, the second digital token being decoupled from the identity of the customer operating the payer system, the second digital token being provided on availability of funds for the payer system transmitting the second token request, the second digital token comprising a second field-based structure including:

a second issuer identification status field that uniquely identifies the second computing device as the entity minting the second digital token, a second token value field that identifies a value associated with the second digital token where the value is recognizable by the payer system and the payee system, a second authorization status field set to indicate that the second digital token is authorized for use in the distributed transaction environment, a second spent status field indicating whether the second digital token has been used previously within the distributed transaction environment, the second spent status field being set to one of a spent status or an unspent status to indicate whether the second digital token is consumed previously, a second validation status field configurable to indicate a validated status in response to the second digital token being validated by the second computing device within the distributed transaction environment, a second conditions field defining a second conditions set governing permitted use of the second digital token, and a second conversion status field indicating whether the second digital token has been previously modified;

transmitting, from the second computing device, the second digital token to the payer system for storage on the payer system;

selecting an item for purchase on a user interface associated with the payer system, by the customer operating the payer system, the item being associated with the payee system;

receiving, by the payer system, an invoice for the item, the invoice being generated by the payee system, the invoice identifying a corresponding monetary value of the item;

selecting one of the first digital token and the second digital token with a value greater than the monetary value of the item, and designating that digital token as a selected token;

subsequently transmitting, from the payer system, a change request and the selected token to the corresponding computing device that minted the selected token;

subsequently generating, at the corresponding computing device, at least two digital change tokens, wherein a token value of one of the at least two digital change tokens is equal to the corresponding monetary value of the item as indicated in the invoice, and wherein a combined value of the at least two digital change tokens is equal to a value of the selected token;

subsequently receiving, at the payer system, the at least two digital change tokens from the corresponding computing device, and designating the digital change token with a corresponding token value equal to the corresponding monetary value of the item as the transaction token;

subsequently transmitting, by the payer system, the transaction token to the payee system;

subsequently receiving, at a computing device, a validation request to validate the transaction token received by the payee system, wherein the validation request is transmitted to the computing device based on the issuer identification status field comprised in the transaction token;

subsequently operating the computing device to validate the transaction token to confirm that the transaction token is minted by the computing device and is in good standing and update the validation status field of the transaction token to indicate that the transaction token is validated, and upon successful validation, triggering instantaneous delivery of the item by the payee system to the customer operating the payer system, wherein the first digital token and the second digital token are in good standing when the corresponding computing devices confirm that the spent status field of the corresponding digital token identifies the unspent status;

wherein if the computing device determines that the transaction token is not minted by that computing device, recording a requested transaction as unsuccessful, and if a corresponding conditions field of the transaction token defines a non-permitted use condition, and the computing device determines that the requested transaction violates the non-permitted use condition, recording the transaction as unsuccessful.

2. The method of claim 1, further comprising storing the first digital token and the second digital token in a wallet associated with the payer system, and wherein the first digital token and the second digital token are accessible by at least one registered user of the wallet.

3. The method of claim 2, wherein for each registered user in the at least one registered user, the wallet application is configured with an authorization amount corresponding to a maximum transaction value allowable in the transaction for that registered user.

4. The method of claim 1, wherein the transaction token is received by the computing device for validation from the acquirer system associated with the payee system, wherein the transaction token is processed at the acquirer system to identify the corresponding computing device that minted that token.

5. The method of claim 1, wherein if the validation status field of the transaction token is updated, recording the transaction as successful; transmitting, from the computing device, an equivalent amount of fund corresponding to the transaction token to an acquirer system associated with the payee system; and transferring the item from the payee system to the payer system.

6. The method of claim 1, wherein each of the first and second digital tokens comprise conditions of use, wherein the conditions of use limit the use of the first and second digital tokens within the transaction system.

7. The method of claim 1, wherein the at least two digital change tokens comprises a corresponding token denomination and the method further comprises:

storing a transaction history record in a database corresponding to the transaction between payer system and the payee system; and generating a token denomination data based on the transaction history record, wherein, when generating a digital change token by the corresponding computing device, the denomination data is used by the corresponding computing device to determine the corresponding token denomination to facilitate the transaction between the payer system and the payee system.

8. The method of claim 1, wherein each of the first and second digital token is selected from the group consisting of government-issued currency, foreign currency, cryptocurrency, virtual currency, proprietary tokens, loyalty points, commodities, real estate, stocks, bonds, and securities.

9. A computing system for improving transaction processing efficiency across an identity-agnostic distributed transaction environment based on digital token value change, the distributed transaction environment comprising a payer subsystem, a payee subsystem, and two or more issuer subsystems, the computing system comprising at least one processor configured to:

receive a first token request, at a first computing device corresponding to a first issuer subsystem, for a first digital token and a second token request, at a second computing device corresponding to a first issuer subsystem, for a second digital token, the first and the second token requests being issued by the payer subsystem, and the first and the second digital tokens to be used in one or more transactions between the payer subsystem and the payee subsystem;

operate the first computing device to mint the first digital token using a first cryptographic protocol, the first digital token being decoupled from an identity of a customer operating the payer subsystem, the first digital token being provided based on availability of funds for the payer subsystem transmitting the first token request, the first digital token comprising a first field-based structure including: a first issuer identification status field that uniquely identifies the first computing device as an entity that mints the first digital token, a first token value field that identifies a value associated with the first digital token where the value is recognizable by the payer subsystem and the payee subsystem, a first authorization status field set to indicate that the first digital token is authorized for use in the distributed transaction environment, a first spent status field indicating whether the first digital token has been used previously within the distributed transaction environment, the first spent status field being set to one of a spent status or an unspent status to indicate whether the first digital token is consumed previously, and a first validation status field configurable to indicate a validated status in response to the first digital token being validated by the first computing device within the distributed transaction environment, a first conditions field defining a first conditions set governing permitted use of the first digital token, and a first conversion status field indicating whether the first digital token has been previously modified;

transmit, from the first computing device, the first digital token to the payer subsystem for storage on the payer subsystem;

operate the second computing device to mint the second digital token using a second cryptographic protocol, the second digital token being decoupled from the identity of the customer operating the payer subsystem, the second digital token being provided based on availability of funds for the payer subsystem transmitting the second token request, the second digital token comprising a second field-based structure including: a second issuer identification status field that uniquely identifies the second computing device as the entity minting the second digital token, a second token value that identifies a value associated with the second digital token where the value is recognizable by the payer subsystem and the payee subsystem, a second authorization status field set to indicate that the second digital token is authorized for use in the distributed transaction environment, a second spent status field indicating whether the second digital token has been used previously within the distributed transaction environment, the second spent status field being set to one of a spent status or an unspent status to indicate whether the second digital token is consumed previously, a second validation status field configurable to indicate a validated status in response to the second digital token being validated by the second computing device within the distributed transaction environment, a second conditions field defining a second conditions set governing permitted use of the second digital token, and a second conversion status field indicating whether the second digital token has been previously modified;

transmit, from the second computing device, the at least one second digital token to the payer subsystem for storage on the payer subsystem;

select an item for purchase on a user interface associated with the payer subsystem, by the customer operating the payer subsystem, the item being associated with the payee subsystem;

receive, at the payer subsystem, an invoice for the item, the invoice being generated by the payee subsystem, the invoice identifying a corresponding monetary value of the item;

select one of the first digital token and the second digital token with a value greater than the monetary value of the item, and designate that digital token as a selected token;

subsequently transmit, from the payer subsystem, a change request and the selected token to the corresponding issuer subsystem that minted the selected token;

subsequently generate, at the corresponding issuer subsystem, at least two digital change tokens, wherein a token value of one of the at least two digital change tokens is equal to the corresponding monetary value of the item as indicated in the invoice, and wherein a combined value of the at least two digital change tokens is equal to a value of the selected token;

subsequently receive, at the payer subsystem, the at least two digital change tokens from the corresponding issuer subsystem, and designate the digital change token with a corresponding token value equal to the corresponding monetary value of the item as the transaction token;

subsequently transmit, by the payer subsystem, the transaction token to the payee subsystem;

subsequently receive, at an issuer subsystem, a validation request to validate the transaction token received by the payee subsystem, wherein the validation request is transmitted to the issuer subsystem based on the issuer identification status field comprised in the transaction token;

subsequently operate the issuer subsystem to validate the transaction token to confirm that the transaction token is minted by the issuer subsystem and is in good standing and update the validation status field of the transaction token to indicate that the transaction token is validated, and upon successful validation, trigger instantaneous delivery of the item by the payee system to the customer operating the payer system, wherein the first digital token and the second digital token are in good standing when the corresponding computing devices confirm that the spent status field of the corresponding digital token identifies the unspent status;

wherein if the issuer subsystem determines that the transaction token is not minted by that issuer subsystem, record a requested the transaction as unsuccessful, and if a corresponding conditions field of the transaction token defines a non-permitted use condition, and the computing device determines that the requested transaction violates the non-permitted use condition, recording the transaction as unsuccessful.

10. The system of claim 9, wherein each of the first and second digital token is selected from the group consisting of government-issued currency, foreign currency, cryptocurrency, virtual currency, proprietary tokens, loyalty points, commodities, real estate, stocks, bonds, and securities.

11. A non-transitory computer-readable medium storing computer-executable instructions, the instructions for causing at least one processor to execute a method performed by one or more computing devices for improving transaction processing efficiency across an identity-agnostic distributed transaction environment based on digital token value change, the distributed transaction environment comprising a payer system, a payee system, and two or more issuer systems, the method comprising:

receiving a first token request, at a first computing device corresponding to a first issuer system, for a first digital token and a second token request, at a second computing device corresponding to a second issuer system, for a second digital token, the first and the second token requests being issued by the payer system, and the first and the second digital tokens to be used in one or more transactions between the payer system and the payee system;

operating the first computing device to mint the first digital token using a first cryptographic protocol, the first digital token being decoupled from an identity of a customer operating the payer system, the first digital token being provided based on availability of funds for the payer system transmitting the first token request, the first digital token comprising a first field-based structure including: a first issuer identification status field that uniquely identifies the first computing device as an entity minting the first digital token, a first token value field that identifies a value associated with the first digital token where the value is recognizable by the payer system and the payee system, a first authorization status field set to indicate that the first digital token is authorized for use in the distributed transaction environment, a first spent status field indicating whether the first digital token has been used previously within the distributed transaction environment, the first spent status field being set to one of a spent status or an unspent status to indicate whether the first digital token is consumed previously, a first validation status field configurable to indicate a validated status in response to the first digital token being validated by the first computing device within the distributed transaction environment, a first conditions field defining a first conditions set governing permitted use of the first digital token, and a first conversion status field indicating whether the first digital token has been previously modified;

transmitting, from the first computing device, the first digital token to the payer system for storage on the payer system;

operating the second computing device to mint the second digital token using a second cryptographic protocol, the second digital token being decoupled from the identity of the customer operating the payer system, the second digital token being provided on availability of funds for the payer system transmitting the second token request, the second digital token comprising a second field-based structure including: a second issuer identification status field that uniquely identifies the second computing device as the entity minting the second digital token, a second token value field that identifies a value associated with the second digital token where the value is recognizable by the payer system and the payee system, a second authorization status field set to indicate that the second digital token is authorized for use in the distributed transaction environment, a second spent status field indicating whether the second digital token has been used previously within the distributed transaction environment, the second spent status field being set to one of a spent status or an unspent status to indicate whether the second digital token is consumed previously, a second validation status field configurable to indicate a validated status in response to the second digital token being validated by the second computing device within the distributed transaction environment, a second conditions field defining a second conditions set governing permitted use of the second digital token, and a second conversion status field indicating whether the second digital token has been previously modified;

transmitting, from the second computing device, the second digital token to the payer system for storage on the payer system;

selecting an item for purchase on a user interface associated with the payer system, by the customer operating the payer system, the item being associated with the payee system;

receiving, by the payer system, an invoice for the item, the invoice being generated by the payee system, the invoice identifying a corresponding monetary value of the item;

selecting one of the first digital token and the second digital token with a value greater than the monetary value of the item, and designating that digital token as a selected token;

subsequently transmitting, from the payer system, a change request and the selected token to the corresponding computing device that minted the selected token;

subsequently generating, at the corresponding computing device, at least two digital change tokens, wherein a token value of one of the at least two digital change tokens is equal to the corresponding monetary value of the item as indicated in the invoice, and wherein a combined value of the at least two digital change tokens is equal to a value of the selected token;

subsequently receiving, at the payer system, the at least two digital change tokens from the corresponding computing device, and designating the digital change token with a corresponding token value equal to the corresponding monetary value of the item as the transaction token;

subsequently transmitting, by the payer system, the transaction token to the payee system;

subsequently receiving, at a computing device, a validation request to validate the transaction token received by the payee system, wherein the validation request is transmitted to the computing device based on the issuer identification status field comprised in the transaction token;

subsequently operating the computing device to validate the transaction token to confirm that the transaction token is minted by the computing device and is in good standing and update the validation status field of the transaction token to indicate that the transaction token is validated, and upon successful validation, triggering instantaneous delivery of the item by the payee system to the customer operating the payer system, wherein the first digital token and the second digital token are in good standing when the corresponding computing devices confirm that the spent status field of the corresponding digital token identifies the unspent status;

wherein if the computing device determines that the transaction token is not minted by that computing device, recording a requested transaction as unsuccessful, and if a corresponding conditions field of the transaction token defines a non-permitted use condition, and the computing device determines that the requested transaction violates the non-permitted use condition, recording the transaction as unsuccessful.

12. The non-transitory computer-readable medium of claim 11, wherein each of the first and second digital token is selected from the group consisting of government-issued currency, foreign currency, cryptocurrency, virtual currency, proprietary tokens, loyalty points, commodities, real estate, stocks, bonds, and securities.

* * * * *